United States Patent
Nixon et al.

(10) Patent No.: US 11,768,878 B2
(45) Date of Patent: *Sep. 26, 2023

(54) SEARCH RESULTS DISPLAY IN A PROCESS CONTROL SYSTEM

(71) Applicant: FISHER-ROSEMOUNT SYSTEMS, INC., Round Rock, TX (US)

(72) Inventors: Mark J. Nixon, Round Rock, TX (US); Peter Hartmann, Austin, TX (US); Richard Clarence Dayo Fabros, Laguna (PH); Anthony Amaro, Jr., Cedar Park, TX (US); John M. Caldwell, Austin, TX (US); Mariana C. Dionisio, Austin, TX (US); Benjamin J. Jackman, Cedar Park, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 361 days.

This patent is subject to a terminal disclaimer.

(21) Appl. No.: 16/577,855

(22) Filed: Sep. 20, 2019

(65) Prior Publication Data

US 2021/0089593 A1 Mar. 25, 2021

(51) Int. Cl.
*G06F 16/00* (2019.01)
*G06F 16/903* (2019.01)
(Continued)

(52) U.S. Cl.
CPC ...... *G06F 16/90348* (2019.01); *G06F 16/908* (2019.01); *G06F 16/909* (2019.01); *G06F 16/9035* (2019.01); *G06F 16/9038* (2019.01)

(58) Field of Classification Search
CPC .. G06F 16/908; G06F 16/909; G06F 16/9035; G06F 16/9038; G06F 16/90348
(Continued)

(56) References Cited

U.S. PATENT DOCUMENTS 5,689,619 A 11/1997 Smyth
5,835,008 A 11/1998 Colemere, Jr.
(Continued)

FOREIGN PATENT DOCUMENTS

EP 3 076 311 A1 10/2016
EP 3 514 641 A1 7/2019
(Continued)

OTHER PUBLICATIONS

"Display Design Handbook—Refining Edition," Center for Operator Performance (2018).
(Continued)

*Primary Examiner* — Albert M Phillips, III
*Assistant Examiner* — Rezwanul Mahmood

(57) ABSTRACT

To provide search capabilities in a process control system, a contextual knowledge repository is generated that organizes process plant-related data according to semantic relations between the process plant-related data and the process plant entities. When a user submits a process plant search query related to process plant entities within a process plant, search results are obtained by identifying a data set from the contextual knowledge repository which is responsive to the process plant search query. The search results are then presented on a user interface device based on the identified data set. To allow for searches to be performed by user interface devices external to the process plant, a data diode is disposed between a field-facing component and an edge-facing component of the process plant so that data flows from the field-facing component to the edge-facing component without flowing from the edge-facing component to the field-facing component.

23 Claims, 14 Drawing Sheets

(51) Int. Cl.
  *G06F 16/9035* (2019.01)
  *G06F 16/9038* (2019.01)
  *G06F 16/908* (2019.01)
  *G06F 16/909* (2019.01)

(58) Field of Classification Search
  USPC ........................................................ 707/723
  See application file for complete search history.

(56) References Cited

U.S. PATENT DOCUMENTS

| | | | | |
|---|---|---|---|---|
| 6,484,109 | B1* | 11/2002 | Lofall | G01H 1/003 |
| | | | | 702/56 |
| 6,879,971 | B1* | 4/2005 | Keeler | G06N 3/047 |
| | | | | 706/903 |
| 6,909,934 | B1* | 6/2005 | Chang | G05B 19/41865 |
| | | | | 700/121 |
| 7,392,165 | B2* | 6/2008 | Nixon | G05B 17/02 |
| | | | | 700/51 |
| 7,711,440 | B1* | 5/2010 | Campbell | G05B 19/4183 |
| | | | | 707/769 |
| 9,805,528 | B1* | 10/2017 | Toepke | G07C 9/27 |
| 9,934,671 | B1* | 4/2018 | Anderson | G05B 23/0254 |
| 10,176,846 | B1* | 1/2019 | Sreedhara | G11B 27/34 |
| 10,257,163 | B2* | 4/2019 | Rotvold | H04L 63/061 |
| 10,270,745 | B2* | 4/2019 | Rotvold | H04W 12/088 |
| 10,338,549 | B2* | 7/2019 | Nixon | H04L 67/01 |
| 10,386,827 | B2* | 8/2019 | Enver | G05B 19/41865 |
| 10,530,748 | B2* | 1/2020 | Rotvold | H04L 63/10 |
| 10,534,342 | B2* | 1/2020 | Nixon | G05B 19/052 |
| 10,539,936 | B2* | 1/2020 | Nixon | H04L 41/06 |
| 10,551,814 | B2* | 2/2020 | Sherriff | G05B 19/052 |
| 10,649,449 | B2* | 5/2020 | Bell | G05B 23/024 |
| 10,809,702 | B2* | 10/2020 | Nixon | H04W 12/088 |
| 10,877,465 | B2* | 12/2020 | Nixon | G05B 19/4184 |
| 10,915,081 | B1* | 2/2021 | Nixon | H04W 4/00 |
| 10,962,965 | B2* | 3/2021 | Cahill | G05B 19/4185 |
| 11,009,859 | B2* | 5/2021 | Wang | G06F 21/645 |
| 11,016,994 | B2* | 5/2021 | Werner | G06F 16/2379 |
| 11,042,147 | B2* | 6/2021 | Tugbo | G05B 19/4155 |
| 11,115,218 | B2* | 9/2021 | Nixon | H04L 9/0637 |
| 11,165,839 | B2* | 11/2021 | Nixon | H04L 65/61 |
| 11,256,238 | B1* | 2/2022 | Nixon | G05B 19/41855 |
| 11,340,923 | B1* | 5/2022 | Kapoor | G10L 15/22 |
| 11,405,180 | B2* | 8/2022 | Cahill | G06F 8/65 |
| 11,436,242 | B2* | 9/2022 | Nixon | G05B 19/4185 |
| 11,531,325 | B2* | 12/2022 | Nixon | H04L 41/12 |
| 11,537,094 | B2* | 12/2022 | Torio | G05B 19/0426 |
| 11,543,805 | B2* | 1/2023 | Nixon | H04L 67/01 |
| 11,561,956 | B2* | 1/2023 | Auer | G06F 16/24556 |
| 11,636,118 | B2* | 4/2023 | Nixon | G06F 40/211 |
| | | | | 707/769 |
| 2003/0177145 | A1* | 9/2003 | Lohn | G06F 11/1469 |
| 2004/0201602 | A1* | 10/2004 | Mody | G05B 19/409 |
| | | | | 715/700 |
| 2004/0204775 | A1 | 10/2004 | Keyes et al. | |
| 2005/0027376 | A1* | 2/2005 | Lucas | G06F 21/6218 |
| | | | | 700/83 |
| 2005/0027377 | A1* | 2/2005 | Lucas | G05B 19/4188 |
| | | | | 700/83 |
| 2007/0061303 | A1 | 3/2007 | Ramer et al. | |
| 2007/0139441 | A1* | 6/2007 | Lucas | G06N 5/04 |
| | | | | 345/619 |
| 2007/0192715 | A1* | 8/2007 | Kataria | G16H 10/40 |
| | | | | 705/28 |
| 2008/0065705 | A1* | 3/2008 | Miller | G05B 21/02 |
| 2008/0065706 | A1* | 3/2008 | Miller | G05B 15/02 |
| 2008/0120129 | A1* | 5/2008 | Seubert | G06Q 40/125 |
| | | | | 705/305 |
| 2008/0125877 | A1* | 5/2008 | Miller | G05B 15/02 |
| | | | | 707/999.107 |
| 2009/0002147 | A1* | 1/2009 | Bloebaum | H04M 15/42 |
| | | | | 455/565 |
| 2009/0082894 | A1* | 3/2009 | Pettus | G05B 19/418 |
| | | | | 700/105 |
| 2009/0222106 | A1* | 9/2009 | Braun | G05B 19/0426 |
| | | | | 700/3 |
| 2010/0153154 | A1* | 6/2010 | Bergantino | G06Q 10/06 |
| | | | | 705/7.11 |
| 2010/0235767 | A1* | 9/2010 | Hammack | G06T 3/0012 |
| | | | | 715/765 |
| 2010/0275139 | A1* | 10/2010 | Hammack | G05B 19/409 |
| | | | | 715/763 |
| 2011/0087977 | A1* | 4/2011 | Campney | G06F 15/0225 |
| | | | | 715/763 |
| 2011/0230980 | A1* | 9/2011 | Hammack | G05B 19/409 |
| | | | | 700/17 |
| 2012/0078869 | A1* | 3/2012 | Bellville | G06F 16/90 |
| | | | | 707/706 |
| 2012/0227004 | A1* | 9/2012 | Madireddi | G06Q 10/06 |
| | | | | 715/771 |
| 2012/0296448 | A1* | 11/2012 | Balentine | G05B 19/409 |
| | | | | 700/19 |
| 2013/0212420 | A1* | 8/2013 | Lawson | G06F 16/9535 |
| | | | | 713/400 |
| 2013/0253684 | A1* | 9/2013 | Rudnick | G05B 19/056 |
| | | | | 700/106 |
| 2014/0100668 | A1* | 4/2014 | Jundt | G05B 19/4188 |
| | | | | 700/11 |
| 2014/0325331 | A1* | 10/2014 | Madireddi | G06F 40/174 |
| | | | | 715/224 |
| 2015/0005903 | A1* | 1/2015 | Worek | G05B 19/41885 |
| | | | | 700/44 |
| 2015/0105886 | A1* | 4/2015 | Grove | G06F 16/219 |
| | | | | 700/95 |
| 2015/0106346 | A1* | 4/2015 | Grove | G06F 16/219 |
| | | | | 707/695 |
| 2016/0004734 | A1* | 1/2016 | Naryzhny | G06F 16/22 |
| | | | | 707/736 |
| 2016/0147206 | A1* | 5/2016 | Neitzel | H04L 63/0227 |
| | | | | 700/20 |
| 2016/0154910 | A1* | 6/2016 | Altare | G06Q 10/06 |
| | | | | 703/13 |
| 2016/0216706 | A1* | 7/2016 | Christensen | G05B 19/41865 |
| 2016/0261482 | A1* | 9/2016 | Mixer | H04L 43/12 |
| 2016/0344754 | A1* | 11/2016 | Rayapeta | H04L 63/0227 |
| 2016/0371628 | A1* | 12/2016 | Wilkinson | G06Q 10/083 |
| 2017/0010787 | A1* | 1/2017 | Ranganathan | G06F 3/0482 |
| 2017/0085603 | A1 | 3/2017 | Qian et al. | |
| 2017/0102678 | A1* | 4/2017 | Nixon | G05B 17/02 |
| 2017/0102693 | A1* | 4/2017 | Kidd | G05B 19/41875 |
| 2017/0102694 | A1* | 4/2017 | Enver | G05B 19/4184 |
| 2017/0102696 | A1* | 4/2017 | Bell | G05B 23/0275 |
| 2017/0103103 | A1* | 4/2017 | Nixon | G06F 16/2452 |
| 2017/0346768 | A1* | 11/2017 | Wise | H04L 51/066 |
| 2017/0371883 | A1* | 12/2017 | Bailiang | H04B 1/3827 |
| 2018/0026954 | A1* | 1/2018 | Toepke | H04L 63/083 |
| | | | | 726/4 |
| 2018/0046790 | A1* | 2/2018 | Jones | G06F 21/32 |
| 2018/0088566 | A1* | 3/2018 | Billi-Duran | G05B 19/41885 |
| 2018/0107188 | A1* | 4/2018 | Nixon | G05B 19/052 |
| 2018/0109955 | A1* | 4/2018 | Nixon | H04L 41/069 |
| 2018/0112795 | A1* | 4/2018 | Anderson | G05B 23/0221 |
| 2018/0113442 | A1* | 4/2018 | Nixon | G05B 19/4184 |
| 2018/0115516 | A1* | 4/2018 | Rotvold | H04L 63/0209 |
| 2018/0115517 | A1* | 4/2018 | Rotvold | G05B 19/4185 |
| 2018/0181587 | A1* | 6/2018 | von Muhlen | G06F 16/1774 |
| 2018/0217580 | A1* | 8/2018 | Jundt | H04L 41/0806 |
| 2018/0321662 | A1* | 11/2018 | Nixon | G06F 13/4226 |
| 2018/0322274 | A1* | 11/2018 | Lutz | G06F 21/44 |
| 2018/0348000 | A1* | 12/2018 | Cai | G08G 1/0112 |
| 2019/0025790 | A1* | 1/2019 | Sherriff | G05B 19/052 |
| 2019/0049928 | A1* | 2/2019 | Naidoo | G05B 19/4184 |
| 2019/0065529 | A1* | 2/2019 | Batta | G06F 16/29 |
| 2019/0095517 | A1* | 3/2019 | Park | G06F 16/22 |
| 2019/0098113 | A1* | 3/2019 | Park | H04L 67/60 |
| 2019/0101899 | A1* | 4/2019 | Enver | G05B 19/4184 |
| 2019/0138713 | A1* | 5/2019 | Fusenig | G06F 21/55 |
| 2019/0149557 | A1* | 5/2019 | Falk | H04L 63/105 |
| | | | | 713/168 |

(56) References Cited

U.S. PATENT DOCUMENTS

| | | | |
|---|---|---|---|
| 2019/0163348 A1* | 5/2019 | Prakash | G06F 3/04842 |
| 2019/0303420 A1* | 10/2019 | Bourothu | H04N 21/4516 |
| 2019/0324987 A1* | 10/2019 | Kamath | G06F 16/907 |
| 2019/0325174 A1* | 10/2019 | Ashaari | H04W 4/021 |
| 2020/0075006 A1* | 3/2020 | Chen | G10L 13/00 |
| 2020/0175765 A1* | 6/2020 | McAdam | G06F 16/29 |
| 2020/0225643 A1* | 7/2020 | Tugbo | G05B 19/4155 |
| 2020/0225649 A1* | 7/2020 | Cahill | H04L 67/12 |
| 2020/0226123 A1* | 7/2020 | Nixon | H04L 9/3297 |
| 2020/0228316 A1* | 7/2020 | Cahill | H04L 9/3297 |
| 2020/0228342 A1* | 7/2020 | Nixon | H04L 9/3236 |
| 2020/0319845 A1* | 10/2020 | Shoop | G06F 3/0484 |
| 2020/0326694 A1* | 10/2020 | Kimura | G06F 30/18 |
| 2020/0356082 A1* | 11/2020 | Wang | H04L 9/0861 |
| 2020/0387145 A1* | 12/2020 | Nixon | G05B 19/41835 |
| 2020/0387147 A1* | 12/2020 | Nixon | G05B 19/41845 |
| 2020/0387149 A1* | 12/2020 | Nixon | H04L 67/12 |
| 2021/0034617 A1* | 2/2021 | Ruth | G06F 16/2455 |
| 2021/0063979 A1* | 3/2021 | Onteddu | G05B 19/042 |
| 2021/0063996 A1* | 3/2021 | Pirker | G05B 19/406 |
| 2021/0081080 A1* | 3/2021 | Uy | G05B 19/41885 |
| 2021/0081099 A1* | 3/2021 | Uy | G06F 3/0488 |
| 2021/0089354 A1* | 3/2021 | Nixon | G06F 9/546 |
| 2021/0089526 A1* | 3/2021 | Nixon | G05B 13/042 |
| 2021/0089542 A1* | 3/2021 | Nixon | G06F 40/30 |
| 2021/0089592 A1* | 3/2021 | Nixon | G06F 16/90348 |
| 2021/0089593 A1* | 3/2021 | Nixon | G06F 16/90348 |
| 2021/0092107 A1* | 3/2021 | Aragon | H04L 12/66 |
| 2021/0092173 A1* | 3/2021 | Nixon | H04L 12/66 |
| 2021/0208545 A1* | 7/2021 | Zhang | G06N 5/04 |
| 2021/0255596 A1* | 8/2021 | Torio | G05B 19/0426 |
| 2021/0325835 A1* | 10/2021 | Cheng | G05B 23/0208 |
| 2021/0341891 A1* | 11/2021 | Arceno | G06F 8/60 |
| 2022/0075354 A1* | 3/2022 | Nixon | G05B 19/41835 |
| 2022/0078238 A1* | 3/2022 | Nixon | G05B 19/4185 |
| 2022/0078252 A1* | 3/2022 | Nixon | H04L 67/12 |
| 2022/0078267 A1* | 3/2022 | Nixon | G05B 19/0423 |
| 2022/0155961 A1* | 5/2022 | Munugoti | G05B 19/4185 |
| 2022/0253797 A1* | 8/2022 | Billingsley | G06Q 50/28 |
| 2022/0277048 A1* | 9/2022 | Nixon | G06F 16/90335 |
| 2022/0300502 A1* | 9/2022 | Enver | G06F 16/2465 |
| 2022/0308559 A1* | 9/2022 | Rueckert | G05B 9/03 |
| 2022/0311833 A1* | 9/2022 | Rueckert | G06F 9/45558 |
| 2022/0365522 A1* | 11/2022 | Nixon | G05B 19/41885 |
| 2022/0382233 A1* | 12/2022 | Kashiwa | G05B 23/0272 |
| 2022/0391368 A1* | 12/2022 | Naryzhny | G06F 21/6218 |
| 2022/0404786 A1* | 12/2022 | Amaro, Jr. | G05B 9/03 |
| 2022/0404787 A1* | 12/2022 | Amaro, Jr. | G05B 9/03 |
| 2022/0404788 A1* | 12/2022 | Amaro, Jr. | G05B 19/106 |
| 2022/0404789 A1* | 12/2022 | Amaro, Jr. | G05B 9/03 |
| 2022/0404790 A1* | 12/2022 | Amaro, Jr. | G05B 19/41845 |
| 2022/0404798 A1* | 12/2022 | Amaro, Jr. | G06F 11/3466 |
| 2022/0404799 A1* | 12/2022 | Amaro, Jr. | G06F 11/3409 |
| 2022/0404800 A1* | 12/2022 | Amaro, Jr. | H04L 9/30 |
| 2022/0404801 A1* | 12/2022 | Amaro, Jr. | G05B 19/0426 |
| 2022/0404804 A1* | 12/2022 | Amaro, Jr. | G05B 9/03 |
| 2022/0404807 A1* | 12/2022 | Amaro, Jr. | G06F 9/5077 |
| 2022/0404808 A1* | 12/2022 | Amaro, Jr. | G05B 19/41845 |
| 2022/0404810 A1* | 12/2022 | Amaro, Jr. | G06F 11/301 |
| 2022/0404811 A1* | 12/2022 | Amaro, Jr. | G06F 9/5077 |
| 2022/0404812 A1* | 12/2022 | Amaro, Jr. | G06F 9/45558 |
| 2022/0404813 A1* | 12/2022 | Amaro, Jr. | G05B 19/0421 |
| 2022/0405116 A1* | 12/2022 | Amaro, Jr. | G06F 9/45558 |
| 2022/0405130 A1* | 12/2022 | Amaro, Jr. | G05B 19/41835 |
| 2022/0405217 A1* | 12/2022 | Amaro, Jr. | G06F 13/20 |
| 2022/0405278 A1* | 12/2022 | Nixon | G06F 9/541 |
| 2022/0405373 A1* | 12/2022 | Amaro, Jr. | H04L 9/321 |
| 2023/0120025 A1* | 4/2023 | Torio | G05B 19/0426 700/87 |
| 2023/0124264 A1* | 4/2023 | Nixon | G05B 19/41845 700/99 |
| 2023/0140842 A9* | 5/2023 | Hazard | G06N 5/04 706/46 |

FOREIGN PATENT DOCUMENTS

| | | |
|---|---|---|
| EP | 3 685 236 A1 | 7/2020 |
| GB | 2 558 055 A | 7/2018 |
| WO | WO-2019/058162 A1 | 3/2019 |

OTHER PUBLICATIONS

NOA-NAMUR Open Architecture (2017).
Wang et al., "An Industrial IoT System Design for Large-Scale Continuous Condition Monitoring," Proceedings of the IEEE (2018).
U.S. Appl. No. 16/577,838, filed Sep. 20, 2019.
U.S. Appl. No. 16/577,877, filed Sep. 20, 2019.
Search Report for Application No. GB2014562.9, dated Feb. 25, 2021.
Search Report for Application No. GB2014564.5, dated Mar. 3, 2021.
Search Report for Application No. GB2014566.0, dated May 28, 2021.
Examination Report for Application No. GB2014564.5, dated Jan. 30, 2023.

* cited by examiner

800 control modules with bypass not on

Workshop_1303

Path: FC201

Name: BYPASS

SEARCH RESULTS DISPLAY IN A PROCESS CONTROL SYSTEM

RELATED REFERENCES

The present disclosure is related to co-owned U.S. patent application Ser. No. 16/577,838, filed concurrently herewith and entitled "Smart Search Capabilities in a Process Control System"; and co-owned U.S. patent application Ser. No. 16/577,877, filed concurrently herewith and entitled "Presentation of Process Control Information within a Vehicle," the entire disclosures of which are incorporated by reference herein.

TECHNICAL FIELD

The present disclosure relates generally to process plants and to process control systems, and more particularly, to providing search capabilities for conducting search queries of process plant-related data in process plants/process control systems and to securing the delivery of process plant-related data from process plants/process control systems to external systems for presenting the process plant-related data on devices which are remote from the process plants.

BACKGROUND

Distributed process control systems, like those used in chemical, petroleum, pharmaceutical, paper product processing, or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters such as pressure, temperature, etc., and the like to control one or more process executing within the process plant or system. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Automation Solutions, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally speaking, a process control system of a process plant includes field devices, controllers, workstations, and other devices that are interconnected by a set of layered networks and buses. The process control system may, be in turn, be connected with various business and external networks, e.g., to reduce manufacturing and operational costs, enhance productivity and efficiencies, provide timely access to process control and/or process plant information, etc. On the other hand, the interconnection of process plants and/or process control systems to enterprise and/or external networks and systems increases the risk of cyber intrusions and/or malicious cyber attacks that may arise from expected vulnerabilities in commercial systems and applications, such as those used in enterprise and/or external networks. Cyber intrusions and malicious cyber attacks of process plants, networks, and/or control systems may negatively affect the confidentiality, integrity, and/or availability of information assets, which, generally speaking, are vulnerabilities similar to those of general purpose computing networks. However, unlike general purpose computer networks, cyber intrusions of process plants, networks, and/or control systems may also lead to damage, destruction, and/or loss of not only plant equipment, product, and other physical assets, but also to the loss of human life. For example, a cyber intrusion may cause a process to become uncontrolled, and thereby produce explosions, fires, floods, exposure to hazardous materials, etc. Thus, securing communications related to process control plants and systems is of paramount importance.

As a result, process plant personnel such as operators typically cannot view process plant-related data indicative of the run-time operation of the process plant from remote sources, such as mobile devices or vehicle head units. Furthermore, while process plant personnel interact with operator display applications which provide displays and generate reports regarding the operating state of the control system or the devices within the process plant, the operator display applications typically do not allow users to search for items within the process plant, such as control modules, alarms, the amount of a product being produced over a particular time period, etc. Each data point within a process plant may have several descriptors and aspects, such as a run-time aspect representing a physical measurement or set value, a configuration, a current value, a mode, a range, a status, a quality, and other descriptors for the data point. As a result, the complexity of the process plant-related data within the process plant is enormous making it difficult to search for particular data items within such a large data set. Searching becomes even more difficult without context that provides a situational awareness of the run-time data.

SUMMARY

Techniques, systems, apparatuses, components, devices, and methods for providing search functionality within the process plant and for remotely receiving and viewing process plant-related data are disclosed herein. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes that operate to manufacture, refine, transform, generate, or produce physical materials or products.

To provide search functionality within the process plant, a process plant search query server receives and analyzes process plant search queries from software modules and/or user interface devices, such as operator workstations, mobile devices such as smart phones and tablets, vehicle head units, etc. The process plant search queries may be search queries related to process plant entities within the process plant, such as search queries regarding control modules, alarms, process flow modules, process parameter data for process plant entities, product parameter data for a product generated by the process plant entities, the amount of a product being produced over a particular time period, etc.

The process plant search queries may be provided by users in a natural language format, such as "Show me the alarms at my boiler unit." The process plant search query server then analyzes the process plant search query to identify the subject of the search query (e.g., alarms), modifiers or filters for filtering the search results (e.g., alarms specific to a boiler unit), and to identify the context of the process plant search query (e.g., the user is a plant supervisor for a process plant in Houston, Tex. and supervises Plant Area A which has one boiler unit). Then the process plant search query server obtains process plant-related data related to the process plant search query. For example, the process plant search query server may obtain process plant-related data from a contextual knowledge repository that organizes process plant-related data according to semantic relations between the process plant-related data and the process plant entities. In the example above, the process plant search query server may obtain process plant-related data from the contextual knowledge repository for each of the alarms corresponding to the boiler unit in Plant Area A in the Houston plant.

The process plant search query server then generates a set of process plant search results using the obtained process plant-related data. For example, the set of process plant search results may include six process plant search results each corresponding to a different alarm. The process plant search query server may then provide the set of search results for presentation by the user interface device. For example, the search results may be presented graphically on a user interface or in an audio format via a speaker. In some implementations, each search result includes a selectable link to additional information regarding the search result. For example, a search results display on the user interface device may present the names of each of the alarms (e.g., Alarm A, Alarm B, Alarm C, etc.), where each of the names includes a selectable link to additional information regarding the alarm. When one of the names is selectable, the user interface device may present detailed information regarding the alarm (e.g., the type of alarm, the priority of the alarm, an alarm message, control modules associated with the alarm, etc.). The user interface device may also present a process flow module graphically depicting the alarm and process plant entities corresponding to the alarm. The search result display may also present a preview of the detailed information regarding the alarm, such as thumbnail image of a control module or process flow module that graphically depicts the alarm.

In some implementations, the process plant search results may be ranked and presented in a ranked order on the search results display. For example, the process plant search query server may assign a score to each of the process plant search results according to relevance to the process plant search query. More specifically, the process plant search query server may determine that high priority or critical alarms have higher relevance to the process plant search query than low priority alarms. Accordingly, the process plant search results corresponding to high priority or critical alarms may be ranked above the process plant search results corresponding to low priority alarms. Thus, the process plant search results corresponding to high priority or critical alarms may be presented above the process plant search results corresponding to low priority alarms on the search results display.

Furthermore, the presentation of the process plant search results may be adjusted based on the type, size, and/or capabilities of the user interface device. If the user interface device has a display but does not have a speaker, the process plant search results may be presented graphically. If the user interface device has a speaker but does not have a display, the process plant search results may be presented audibly. Additionally, if the user interface device is a particular type or has a screen size below a threshold size (e.g., a mobile device), the process plant search query server may provide a single process plant search result to display on the user interface device (e.g., the highest ranking process plant search result). On the other hand, if the user interface device has a screen size above the threshold size (e.g., an operator workstation), the process plant search query server may provide the set of process plant search results to display on the user interface device.

In some implementations, the process plant search query server interacts with process plant-related data generated within the process plant. In this manner, the process plant search query server may provide process flow modules, control modules, etc., which are communicatively coupled to controllers and field devices within the process plant to the user interface device as search results. The user may then interact with the process flow modules, control modules, etc., such that changes to process plant-related data included in the process flow modules, control modules, etc., result in changes in the on-line process plant. For example, a user may adjust a set point value via a user control on a display of a process flow module. The user interface device may then communicate with the controller to adjust the set point value in the on-line process plant.

In other implementations, the process plant search query server does not interact directly with process plant-related data generated within the process plant. Instead, some of the process plant-related data generated within the process plant is duplicated and provided across a unidirectional data diode to an edge-facing component. In this manner, users may view a duplicate of the process plant-related data representing activity in the on-line process plant without being able to interact with controllers, field devices, or any other devices operating in the on-line process plant. Accordingly, process plant search results and/or other data from the process plant search query server may be exposed to external sources, such as mobile devices, vehicle head units, etc., which are not authorized to communicate with process plant equipment and do not include the level of security necessary for authorized devices.

DETAILED DESCRIPTION

Figure 1:
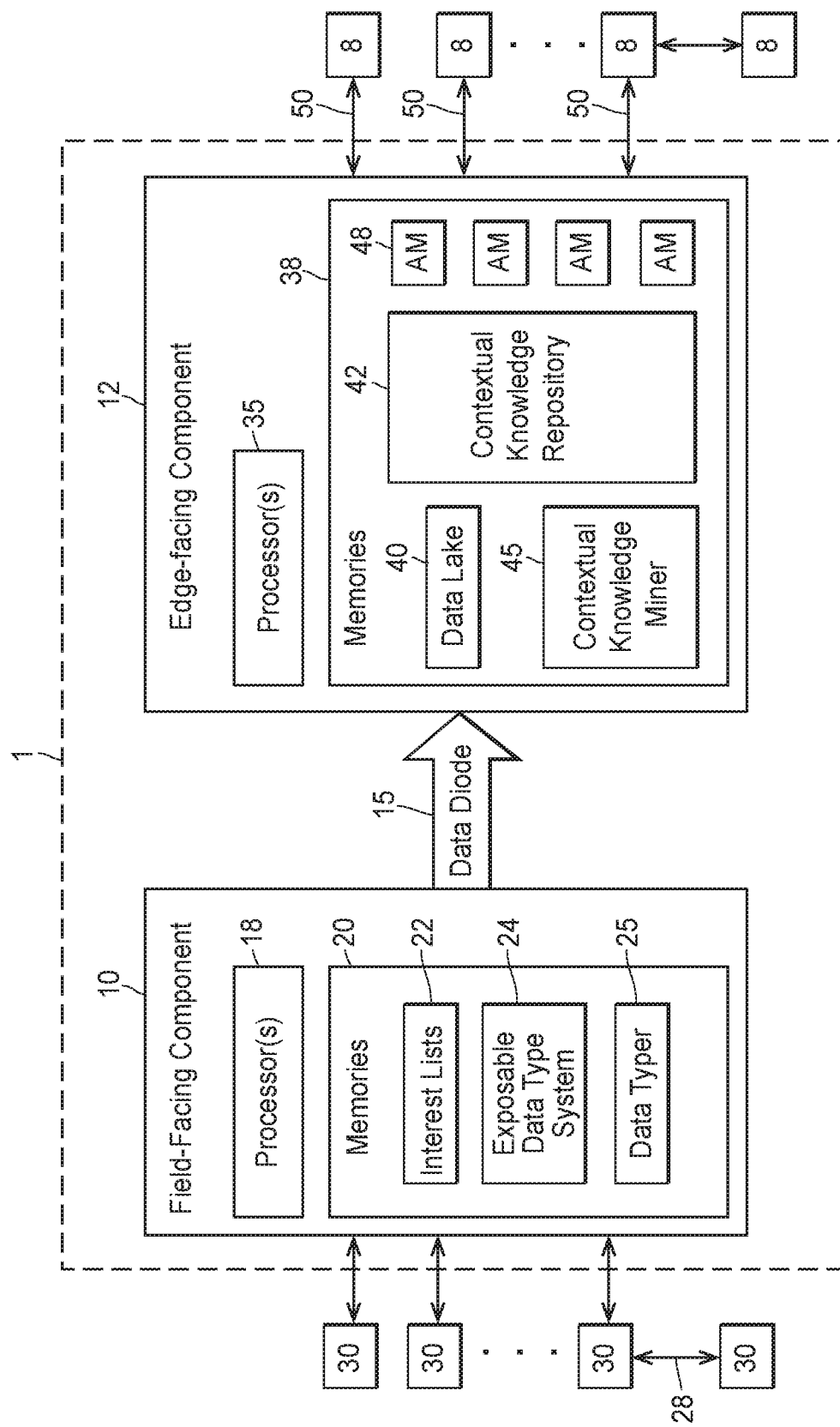
FIG. 1 is a block diagram of an example edge gateway system for a process plant or process control system.

As discussed above, process plant-related data is duplicated and received at a computing device in a secure manner. Once the process plant-related data is received in the secure manner, the process plant-related data may be provided to external sources, such as mobile devices, vehicle head units, etc., which are not authorized to communicate with the process plant or controllers, field devices, or other devices within the process plant. The process plant-related data may be provided to the external sources to present reports, graphical representations of control modules and process flow modules, and other information related to the process plant which process plant personnel typically view at plant workstations. In this manner, process plant personnel may view this information remotely without the risk of unauthorized personnel being able to control devices in the process plant from external sources.

Furthermore, the process plant-related data may be presented as process plant search results in response to process plant search queries generated on user interface devices, which may operate within the process plant (e.g., operator workstations, mobile workstations) or externally (e.g., mobile devices, vehicle head units, desktop or laptop computers, wearable devices, etc.).

Securing process plants and process control systems against cyber intrusions and malicious cyber attacks typically utilizes a layered or leveled security hierarchy, with at least some of the layers or levels secured by using firewalls and other security mechanisms. Using the Purdue Model for Control Hierarchy logical framework standardized by ISA (International Society of Automation) 95.01—IEC (International Electrotechnical Commission) 62264-1 as an example framework, process control systems generally fall into security levels 0-2 (e.g., levels that have a higher level of trust in the safety and validity of messages, packets, and other communications), and manufacturing, corporate, and enterprise systems generally fall into security levels 3-5 (e.g., levels that have a lower level of trust). For example, process plant systems, networks, and devices at security levels 0-3 may be protected against threats from enterprise networks at security levels 4-5, and/or from any external networks higher than security level 5 exploiting the enterprise networks, e.g., by using a demilitarized zone (DMZ) and/or one or more firewalls. However, as more and more services and applications that operate on process plant-related data are moved to execute remotely, e.g., on networks and systems outside of or external to the process plant (e.g., at security levels 4 and/or 5 within the enterprise or business), and/or even on networks and systems that are external to the enterprise or business (e.g., above security level 5, via the Internet or other public network), stronger techniques for preventing process plant systems, networks, and devices from being compromised are needed.

The novel systems, components, apparatuses, methods, and techniques described herein address these and other security issues related to process plants and their networks, and in particular are directed to the secure delivery of process plant-related data to one or more external systems that are consumers of the process plant-related data.

To illustrate, FIG. 1 is a block diagram of an example edge gateway system 1 which securely delivers process plant-related data from a process plant 5 to one or more external systems 8. The edge gateway system 1 includes a field-facing component 10 that is communicatively connected to an edge-facing component 12 via a data diode 15. The field-facing component 10 includes one or more processors 18 and one or more non-transitory memories or data storage devices 20 storing at least one set of data and at least one set of computer-executable instructions, where the at least one set of computer-executable instructions are executable by the one or more processors 18. For example, as illustrated in FIG. 1, the one or more memories 20 of the field-facing component 10 store respective data sets such as one or more interest lists 22, an exposable data type system 24, and optionally other data sets (not shown). The one or more memories 20 of the field-facing component 10 further store computer-executable instructions for a data typer 25, and may store other sets of computer-executable instructions (not shown). The field-facing component 10 is communicatively connected to one or more process plant communications networks, data networks, and/or links 28, which may include any number of wired and/or wireless communications networks, data networks, and/or links that communicatively connect various devices and/other data sources 30 which are associated with the process plant 5 and which generate data, e.g., while the process plant 5 is operating to control an industrial process. More detailed descriptions of embodiments of the field-facing component 10 of the edge gateway system 1 and its subcomponents are provided elsewhere within this disclosure.

The edge-facing component 12 of the edge gateway system 1 includes one or more processors 35 and one or more non-transitory memories or data storage devices 38 storing at least one set of data and at least one set of computer-executable instructions, where the at least one set of computer-executable instructions are executable by the one or more processors 35. For example, as illustrated in FIG. 1, the one or more memories 38 of the edge-facing component 12 store respective data sets corresponding to a data lake 40 and a contextual knowledge repository 42, and the one or more memories 38 of the edge-facing component 12 store at least a partial copy 24B or duplicate of the exposable data type system 24A of the field-facing component 10, respective computer-executable instructions for a contextual knowledge miner 45 and one or more access mechanisms 48 for the contextual knowledge repository 42. Of course, although not shown in FIG. 1, the one or more memories 38 of the edge-facing component 12 may store other sets of data and/or other sets of computer-executable instructions. As also illustrated in FIG. 1, the edge-facing component 12 of the edge gateway system 1 is communicatively connected to one or more external systems 8 via one or more external communications networks, data networks, and/or links 50. The one or more external communications networks, data networks, and/or links 50 may include any number of wired and/or wireless communications networks, data networks, and/or links, and may include any number of private and/or public networks and/or links. The one or more external systems 8 may include any number of public computing systems and/or private computing systems, which may be respectively implemented using any suitable technology, such as banks of servers, cloud computing systems, and the like, and on which various applications (e.g., third-party applications, websites, etc.) may execute. More detailed descriptions of embodiments of the edge-facing component 12 and its subcomponents are provided elsewhere within this disclosure.

As shown in FIG. 1, the field-facing component 10 and the edge-facing component 12 are interconnected via a data diode 15 (although in some implementations of the edge gateway system 1 (not shown), the data diode 15 may be omitted and the field-facing component 10 and the edge-facing component 12 are in direct connection, or are an integral, unitary logical and/or physical component). At any rate, as shown in FIG. 1, the data diode 15 includes one or more transmission media via which data (e.g. electronic data) is transported from the field-facing component 10 to the edge-facing component 12, where the data diode 15 is the only communicative connection between the field-facing component 10 and the edge-facing component 12. In a preferred embodiment, the data diode 15 is unidirectional, so that any and all types of data (e.g., signaling data, control data, administrative data, payload data, etc.) flows only from the field-facing component 10 to the edge-facing component 12, and does not flow (and indeed, in some embodiments, is not physically able to flow) from the edge-facing component 12 to the field-facing component 10. That is, the data diode 15 may be physically and/or logically configured to prevent any and all types of data (e.g., signaling data, control data, administrative data, payload data, etc.) from flowing from the edge-facing component 12 to the field-facing component 10. In an example, the unidirectional data diode 15 is implemented using an optical fiber link or cable. In another example, software and/or hardware of the unidirectional data diode 15 may be otherwise configured to prevent the flow of any type of data (e.g., signaling data, control data, administrative data, payload data, etc.) from the edge-facing component 12 to the field-facing component 10. For instance, physical ports of the edge-facing component 12 that would otherwise receive data from the one or more external systems 8 may be blocked, disabled, and/or omitted.

Generally speaking, the edge gateway system 1 securely connects and/or bridges the process plant 5 and associated systems at lower-numbered security levels with one or more systems 8 at higher-numbered security levels. For example, with reference to the Purdue Model (or other similar security hierarchy), the data sources 30 and the networks/links 28 via which the edge gateway system 1 obtains process-plant related data may be at lower-numbered security levels (e.g., security level 0 through security level 2), and may include, for example, process control systems, configuration systems, analytics systems, communication/networking systems, asset management systems, diagnostic and/or testing tools and/or systems, commissioning tools and/or systems, user devices and/or operator interfaces, historian systems, batch systems, and other systems, networks, and/or applications associated with the process plant 5. Accordingly, for ease of discussion herein, and not for limitation purposes, the term "process plant 5" is used to collectively refer to the physical process plant as well as to other systems associated with and in communicative connection with the physical process plant that generate and/or communicate data of lower-numbered levels of security.

At the edge gateway system 1 of FIG. 1, the field-facing component 10 that obtains and initially processes the process plant-related data generated by the process plant 5 may be at security level 2 to security level 3, and the data diode 15 and edge-facing component 12 may be at security level 3. The one or more external systems 8 may be at security level 4 or higher, and may include any number of public and/or private systems and various applications executing thereon, such as enterprise applications, third-party applications, publicly-available applications, websites, etc. As such, the edge gateway system 1 securely delivers data generated by process plant-related systems, networks, and/or applications 5 at lower-numbered levels of security to systems, networks, and/or applications 8 at higher-numbered levels of security.

In particular, as shown in FIG. 1, the field-facing component 10 of the edge gateway system 1 obtains or collects data from data sources 30 in accordance with one or more interest lists 22 stored at the field-facing component 10. Interest lists 22 indicate specific process plant-related data that is generated by the process plant 5 in relation to the plant 5 operating to control an industrial process, wherein the indicated process plant-related data is allowed to be exposed (e.g., is exposable) to the external systems, networks, and/or applications 8. As such, interest lists 22 included in the edge gateway system 1 provide an initial level of field-facing security against protected data being inadvertently released from the process plant 5 to external systems 8. Interest lists 22 may indicate specific data-of-interest and/or combinations thereof, such as runtime data, event data, historical data, configuration data, and/or any other type of process plant-related data that is generated by devices, components, and/or systems of and/or related to the process plant 5 at lower-numbered levels of security (e.g., at security levels 0-2). Interest lists 22 may be configured and/or defined via an Interest Studio (not shown in FIG. 1), which is described in more detail elsewhere within this disclosure.

Further, at the field-facing component 10, the data typer 25 respectively types obtained interest list data in accordance with the exposable data type system 24. Generally speaking, the exposable data type system 24 defines a system of data types (including data definitions, names, values, fields, structures, classes, objects, etc.) that are exposed or otherwise made available to the external systems 8. Additionally, the exposable data system 24 defines mappings, conversions, groupings, and/or other arrangements of process plant-related data types into the exposable data types so that process plant-related data content may be utilized and understood by the external systems 8. The term "process plant-related data types," as utilized herein, generally refers to data types (e.g., data definitions, names, values, fields, structures, classes, objects, etc.) that have been defined and/or configured for use by applications, devices, components, systems, and/or networks of the process plant 5. In an embodiment, the exposable data type system 24 may be configured via the Interest Studio (e.g., in a manner such as described elsewhere within this disclosure). At any rate, the exposable data system 24 allows the external systems 8 to interpret process plant-related data that is generated by the process plant 5 and associated lower security level systems without the external systems 8 needing to be aware of any internal data configurations of the plant 5, and without having to query and/or initiate communications with and/or send responses to the process plant 5. As such, the exposable data type system 24 and data typer 25 of the edge gateway system 1 further protect the process plant 5 from possible security breaches from external systems 8. The exposable data type system 24 and the data typer 25 are described in more detail elsewhere in this disclosure.

At least due to the use of the exposable data type system 24 and the data typer 25, the data diode 15 may be a truly unidirectional data diode. Currently known data diodes provide for unidirectional flow of content data, but allow for bi-directional flow of signaling, control, and/or administrative data, such by allowing acknowledgements and/or error conditions to be communicated from a content data-receiving end to the content data-sending end. However, the data diode 15 of the edge gateway system 1 may be truly unidirectional in that no types of data flow from its content data-receiving end to its content data-sending end. Indeed, in embodiments, the data diode 15 is physically configured to prevent any type of data (e.g., signaling, control, administrative, content, etc.) from being delivered from the edge-facing component 12 to the field-facing component 10, e.g., such as in embodiments in which the data diode 15 is implemented via optical transmission media. As such, due to at least the truly unidirectional nature of the data diode 15, the data diode 15 of the edge gateway system 1 still further protects the process plant 5 from possible security breaches from external systems 8.

At the edge-facing component 12 of the edge gateway system 1, the typed, content data that is received from the field-facing component 10 via the data diode 15 is stored in the data lake 40. The contextual knowledge miner 45 mines the data lake 40 to discover relationships between various content data stored in the data lake 40, and generates/modifies/updates the contextual knowledge repository 42 so that the contextual knowledge repository 42 includes indications of both the received content data as well as the discovered relationships. As such, the contextual knowledge repository 42 stores both process plant-related content data (e.g., run-time data, event data, historical data, and/or other types of data provided by the process plant 5, as well as context data that is indicative of relationships between provided process plant-related content data, conditions corresponding to the generation, delivery, and/or reception of the process plant-related content data within the process plant 5, and/or other types of contexts of the process plant-related content data. Knowledge that is stored in the contextual knowledge repository 42 is exposable (e.g., is made available) to the one or more external systems 8.

Indeed, the edge-facing component 12 provides one or more access mechanisms 48 via which the external systems 8 may access at least some of the knowledge stored in the contextual knowledge repository 42. Each access mechanism may respectively include yet another level of protection against possible security breaches from the external systems 8. For example, access mechanisms 48 may be implemented using application programming interfaces (APIs), containers, servers, etc. to aid in preventing external systems from authorized access of the contextual knowledge repository 42 and/or of the process plant 5. The edge-facing component 12 of the edge gateway system 1 and its sub-components are discussed in more detail elsewhere in this disclosure.

Generally speaking, the features, components, and architecture of the edge gateway system 1 provide almost unlimited access of external systems 8 to process plant-related data in a highly secure manner and without impacting the performance of the process plant 5. Additionally, as the edge gateway system 1 contextually provides process plant-related data to the external systems 8, e.g., provides process plant-related content data within the context of the configuration of the process plant 5, external systems 8 may more quickly and easily find and consume process-plant related data. Further, the edge gateway system 1 allows for a multiplicity of different types of applications to safely and easily operate on the contextual knowledge corresponding to the process plant 5, such as mobile connectivity applications, advanced analytical applications, open-systems technology applications (e.g., Node.JS, Docker, Linux, etc.), custom applications, IoT applications, IIoT applications, business and/or enterprise applications (e.g., Excel, Power BI, etc.), and/or other types of applications. Still further, the edge gateway system 1 is easily adaptable to aggregate process plant-related data from multiple process plants and discover related aggregated knowledge therefrom, as well as to aggregate data from external systems at higher levels of security (such as weather systems, supply chain systems, financial systems, etc.) and discover related aggregated knowledge therefrom.

Figure 2:
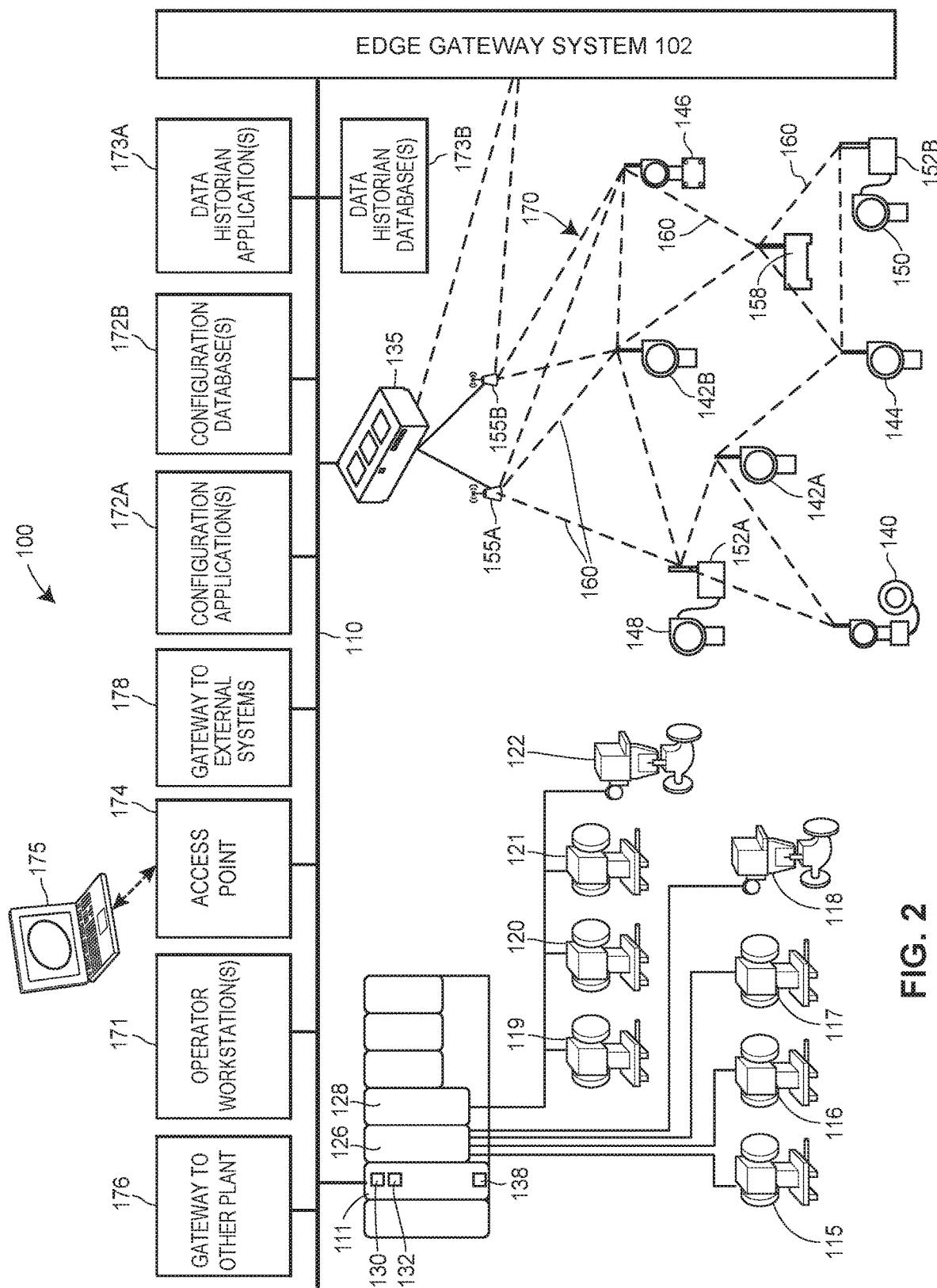
FIG. 2 is a block diagram of an example process plant that illustrates, inter alia, interconnections between various example components of the process plant or process control system, the process control system itself, and other example systems and/or networks.

FIG. 2 is a block diagram of an example process plant 100 which is configured to control an industrial process during on-line or run-time operations, and from which process plant-related may be securely delivered via embodiments of the edge gateway system 1. For example, the process plant 5 of FIG. 1 may include at least portions of the process plant 100 of FIG. 2. As shown in FIG. 2, the process plant 100 is communicatively connected to an edge gateway system 102, which may be an embodiment of the edge gateway system 1 of FIG. 1, for example.

The process plant 100 (which is also interchangeably referred to herein as a process control system 100 or process control environment 100) includes one or more process controllers that receive signals indicative of process and/or other types of measurements made by field devices, process this information to implement a control routine, and generate control signals that are sent over wired or wireless process control communication links or networks to other field devices to control the operation of an industrial process in the plant 100. Typically, at least one field device performs a physical function (e.g., opening or closing a valve, increasing or decreasing a temperature, taking a measurement, sensing a condition, etc.) to control the operation of the process. Some types of field devices communicate with controllers by using I/O devices. Process controllers, field devices, and I/O devices may be wired or wireless, and any number and combination of wired and wireless process controllers, field devices and I/O devices may be included in the process plant environment or system 100.

For example, FIG. 2 illustrates a process controller 111 that is communicatively connected to wired field devices 115-122 via input/output (I/O) cards 126 and 128, and that is communicatively connected to wireless field devices 140-146 via a wireless gateway 135 and a process control data highway or backbone 110. The process control data highway 110 may include one or more wired and/or wireless communication links, and may be implemented using any desired or suitable or communication protocol such as, for example, an Ethernet protocol, an IP or other packet protocol, etc. In some configurations (not shown), the controller 111 may be communicatively connected to the wireless gateway 135 using one or more communications networks other than or in addition to the backbone 110, such as by using any number of other wired or wireless communication links that support one or more communication protocols, data protocols, and/or industrial automation protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, HART-IP, Profibus, FOUNDATION® Fieldbus, etc.

The controller 111, which may be, by way of example, the DeltaV controller sold by Emerson Process Management, may operate to implement a batch process or a continuous process using at least some of the field devices 115-122 and 140-146. In an embodiment, in addition to being communicatively connected to the process control data highway 110, the controller 111 is also communicatively connected to at least some of the field devices 115-122 and 140-146 using any desired hardware and software associated with, for example, standard 4-20 mA devices, I/O cards 126, 128, and/or any smart communication protocol such as the FOUNDATION® Fieldbus protocol, the HART® protocol, the WirelessHART® protocol, etc. In FIG. 2, the controller 111, the field devices 115-122 and the I/O cards 126, 128 are wired devices, and the field devices 140-146 are wireless field devices. Of course, the wired field devices 115-122 and wireless field devices 140-146 could conform to any other desired standard(s) or protocols, such as any wired or wireless protocols, including any standards or protocols developed in the future.

The process controller 111 of FIG. 2 includes a processor 130 that implements or oversees one or more process control routines 138 (e.g., that are stored in a memory 132). The processor 130 is configured to communicate with the field devices 115-122 and 140-146 and with other nodes that are communicatively connected to the controller 111. It should be noted that any control routines or modules described herein may have parts thereof implemented or executed by different controllers or other devices if so desired. Likewise, the control routines or modules 138 described herein which are to be implemented within the process control system 100 may take any form, including software, firmware, hardware, etc. Control routines may be implemented in any desired software format, such as using object oriented programming, ladder logic, sequential function charts, function block diagrams, or using any other software programming language or design paradigm. The control routines 138 may be stored in any desired type of memory 132, such as random access memory (RAM), or read only memory (ROM) Likewise, the control routines 138 may be hard-coded into, for example, one or more EPROMs, EEPROMs, application specific integrated circuits (ASICs), or any other hardware or firmware elements. Thus, the controller 111 may be configured to implement a control strategy or control routine in any desired manner.

The controller 111 implements a control strategy using what are commonly referred to as function blocks, where each function block is an object or other part (e.g., a subroutine) of an overall control routine and operates in conjunction with other function blocks (via communications called links) to implement process control loops within the process control system 100. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system 100. Of course, hybrid and other types of function blocks exist. Function blocks may be stored in and executed by the controller 111, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 111 may include one or more control routines 138 that may implement one or more control loops which are performed by executing one or more of the function blocks.

The wired field devices 115-122 may be any types of devices, such as sensors, valves, transmitters, positioners, etc., while the I/O cards 126 and 128 may be any types of I/O devices conforming to any desired communication or controller protocol. In FIG. 2, the field devices 115-118 are standard 4-20 mA devices or HART® devices that communicate over analog lines or combined analog and digital lines to the I/O card 126, while the field devices 119-122 are smart devices, such as FOUNDATION® Fieldbus field devices, that communicate over a digital bus to the I/O card 128 using a FOUNDATION® Fieldbus communications protocol. In some embodiments, though, at least some of the wired field devices 115, 116 and 118-121 and/or at least some of the I/O cards 126, 128 additionally or alternatively communicate with the controller 111 using the process control data highway 110 and/or by using other suitable control system protocols (e.g., Profibus, DeviceNet, Foundation Fieldbus, ControlNet, Modbus, HART, etc.).

In FIG. 2, the wireless field devices 140-146 communicate via a wireless process control communication network 170 using a wireless protocol, such as the WirelessHART® protocol. Such wireless field devices 140-146 may directly communicate with one or more other devices or nodes of the wireless network 170 that are also configured to communicate wirelessly (using the wireless protocol or another wireless protocol, for example). To communicate with other nodes that are not configured to communicate wirelessly, the wireless field devices 140-146 may utilize a wireless gateway 135 connected to the process control data highway 110 or to another process control communications network. The wireless gateway 135 provides access to various wireless devices 140-158 of the wireless communications network 170. In particular, the wireless gateway 135 provides communicative coupling between the wireless devices 140-158, the wired devices 115-128, and/or other nodes or devices of the process control plant 100. For example, the wireless gateway 135 may provide communicative coupling by using the process control data highway 110 and/or by using one or more other communications networks of the process plant 100.

Similar to the wired field devices 115-122, the wireless field devices 140-146 of the wireless network 170 perform physical control functions within the process plant 100, e.g., opening or closing valves, or taking measurements of process parameters. The wireless field devices 140-146, however, are configured to communicate using the wireless protocol of the network 170. As such, the wireless field devices 140-146, the wireless gateway 135, and other wireless nodes 152-158 of the wireless network 170 are producers and consumers of wireless communication packets.

In some configurations of the process plant 100, the wireless network 170 includes non-wireless devices. For example, in FIG. 2, a field device 148 of FIG. 2 is a legacy 4-20 mA device and a field device 150 is a wired HART® device. To communicate within the network 170, the field devices 148 and 150 are connected to the wireless communications network 170 via a respective wireless adaptor 152A, 152B. The wireless adaptors 152A, 152B support a wireless protocol, such as WirelessHART, and may also support one or more other communication protocols such as Foundation® Fieldbus, PROFIBUS, DeviceNet, etc. Additionally, in some configurations, the wireless network 170 includes one or more network access points 155A, 155B, which may be separate physical devices in wired communication with the wireless gateway 135, or may be provided with the wireless gateway 135 as an integral device. The wireless network 170 may also include one or more routers 158 to forward packets from one wireless device to another wireless device within the wireless communications network 170. In FIG. 2, the wireless devices 140-146 and 152-158 communicate with each other and with the wireless gateway 135 over wireless links 160 of the wireless communications network 170, and/or via the process control data highway 110.

In FIG. 2, the process control system 100 includes one or more operator workstations 171 that are communicatively connected to the data highway 110. Via the operator workstations 171, operators may view and monitor run-time operations of the process plant 100, as well as take any diagnostic, corrective, maintenance, and/or other actions that may be required. At least some of the operator workstations 171 may be located at various, protected areas in or near the plant 100, e.g., in a back-end environment of the plant 100, and in some situations, at least some of the operator workstations 171 may be remotely located, but nonetheless in communicative connection with the plant 100. Operator workstations 171 may be wired or wireless computing devices.

The example process control system 100 is further illustrated as including a configuration application 172A and configuration database 172B, each of which is also communicatively connected to the data highway 110. As discussed above, various instances of the configuration application 172A may execute on one or more computing devices (not shown) to enable users to create or change process control modules and/or other types of modules, and download these modules via the data highway 110 to the controllers 111 and/or other devices of the process control system 100, as well as enable users to create or change operator interfaces via which in operator is able to view data and change data settings within process control routines. The configuration database 172B stores the created (e.g., configured) modules and/or operator interfaces. Generally, the configuration application 172A and configuration database 172B are centralized and have a unitary logical appearance to the process control system 100, although multiple instances of the configuration application 172A may execute simultaneously within the process control system 100, and the configuration database 172B may be implemented across multiple physical data storage devices. Accordingly, the configuration application 172A, configuration database 172B, and user interfaces thereto (not shown) comprise a configuration or development system 172 for control and/or display modules. Typically, but not necessarily, the user interfaces for the configuration system 172 are different than the operator workstations 171, as the user interfaces for the configuration system 172 are utilized by configuration and development engineers irrespective of whether or not the plant 100 is operating in real-time, whereas the operator workstations 171 are utilized by operators during real-time operations of the process plant 100 (also referred to interchangeably here as "run-time" operations of the process plant 100).

The example process control system 100 includes a data historian application 173A and data historian database 173B, each of which is also communicatively connected to the data highway 110. The data historian application 173A operates to collect some or all of the data provided across the data highway 110, and to historize or store the data in the historian database 173B for long term storage. Similar to the configuration application 172A and configuration database 172B, the data historian application 173A and historian database 173B are centralized and have a unitary logical appearance to the process control system 100, although multiple instances of a data historian application 173A may execute simultaneously within the process control system 100, and the data historian 173B may be implemented across multiple physical data storage devices.

In some configurations, the process control system 100 includes one or more other wireless access points 174 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 174 allow handheld or other portable computing devices (e.g., user interface devices 175) to communicate over a respective wireless process control communication network that is different from the wireless network 170 and that supports a different wireless protocol than the wireless network 170. For example, a wireless or portable user interface device 175 may be a mobile workstation or diagnostic test equipment that is utilized by an operator within the process plant 100 (e.g., an instance of one of the operator workstations 171). In some scenarios, in addition to portable computing devices, one or more process control devices (e.g., controller 111, field devices 115-122, or wireless devices 135, 140-158) also communicate using the wireless protocol supported by the access points 174.

In some configurations, the process control system 100 includes one or more gateways 176, 178 to systems that are external to the immediate process control system 100. Typically, such systems are customers or suppliers of information generated or operated on by the process control system 100. For example, the process control plant 100 may include a gateway node 176 to communicatively connect the immediate process plant 100 with another process plant. Additionally or alternatively, the process control plant 100 may include a gateway node 178 to communicatively connect the immediate process plant 100 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 2 only illustrates a single controller 111 with a finite number of field devices 115-122 and 140-146, wireless gateways 35, wireless adaptors 152, access points 155, routers 1158, and wireless process control communications networks 170 included in the example process plant 100, this is only an illustrative and non-limiting embodiment. Any number of controllers 111 may be included in the process control plant or system 100, and any of the controllers 111 may communicate with any number of wired or wireless devices and networks 115-122, 140-146, 135, 152, 155, 158 and 170 to control a process in the plant 100.

As shown in FIG. 2, and simultaneously referring to FIG. 1 for clarity of illustration and not for limitation purposes, the process plant 100 is communicatively connected to an edge gateway system 102, which may be an embodiment of the edge gateway system 1 of FIG. 1. For example, the process plant 100 may communicatively connect to the field-facing component 10 of the edge gateway system 1 via one or more process plant communication networks, data networks, and/or links, either directly and/or via respective gateways of the process plant 100. For instance, the field-facing component 10 of the edge gateway system 1 may be communicatively connected to the process plant 100 via the networks 110, 170, via gateways 135, 176, 178, and/or via other networks, links, and/or gateways associated with the process plant, via which the field-facing component 10 receives or obtains data generated by various data sources 30 associated with the process plant 100.

Generally speaking, the data sources 30 and the networks/links 28 via which the edge gateway system 1 obtains process-plant related data may be at lower levels of the Purdue Model or similar security hierarchy (e.g., Level 0 through Level 2), and may include controllers, field devices, I/O cards, and other types of process control devices. Further, it is understood that the set of data sources 30 associated with the process plant is not limited to only process control devices that directly generate first-order process data, but may additionally or alternatively include any device or component within and/or associated with the process plant 100 that generates process data and/or other types of data as a result of the process plant 100 controlling the on-line process. For example, the set of data sources 30 may include modules, alarms, event historians, batch systems and/or historians, diagnostic devices or components that generate diagnostic data, network routing devices or components that transmit information between various components and/or devices of the process plant 100, an asset management system, a configuration system, an analytics system, mobile devices, and the like. Indeed, any one or more of the components shown in FIG. 2 (e.g., components 111, 115-122, 126, 128, 135, 140-146, 152, 155, 158, 160, 170, 171-176, 178) and other components that are not shown in FIG. 2 may be a data source 30 that generates process plant-related data which may be provided for consumption by one or more external systems 8 via the edge gateway system 1, 102.

Figure 3:
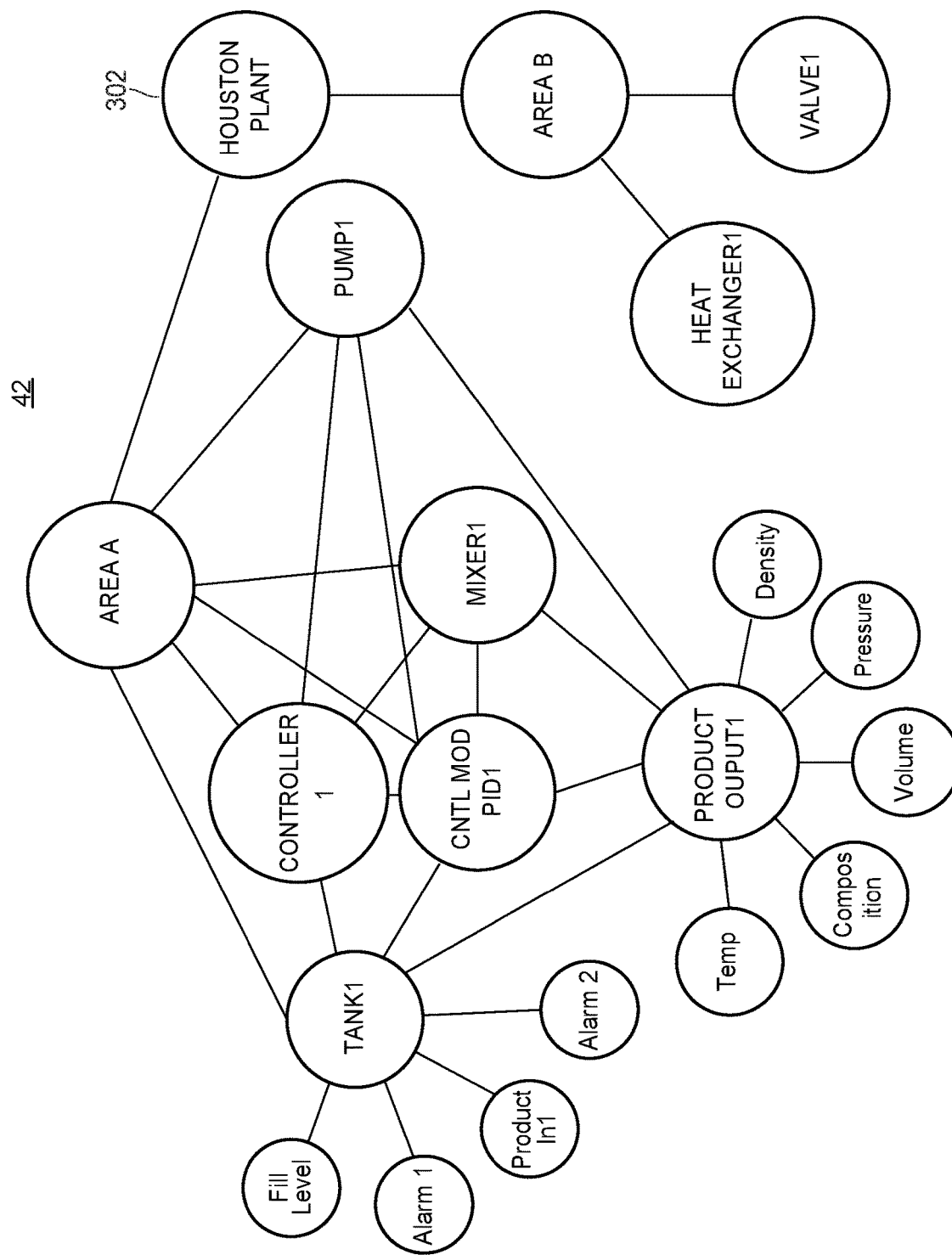
FIG. 3 illustrates a graphical representation of an example contextual knowledge repository storing process plant-related data for a process plant or process control system.

FIG. 3 illustrates a graphical representation of an example contextual knowledge repository 42, such as the contextual knowledge repository 42 described with reference to FIG. 1. The example contextual knowledge repository 42 stores relationships or connections between process plant-related data and process plant entities, such as controllers, field devices, I/O devices, or any other devices within a process plant which perform physical functions to control the process, such as a valve, a tank, a mixer, a pump, a heat exchanger, etc. Process plant entities may include physical or logical elements. As mentioned above, the contextual knowledge repository 42 may be stored at the edge-facing component 12 of the edge gateway system 1 and may include a local copy or duplicate of the process plant-related data generated within the process plant 5. In this manner, the edge-facing component 12 may provide process plant-related data from the contextual knowledge repository 42 to external systems 8 which do not have authorized access to communicate with the process plant 5 in a highly secure manner and without impacting the performance of the process plant 5. For example, the edge-facing component 12 may provide process plant-related data from the contextual knowledge repository 42 to mobile devices, vehicle head units, desktop computers, laptop computers, wearable devices, etc., which are not within the process plant 5 and are not authorized to communicate with devices or components that control on-line operation of the process plant 5.

In other implementations, the contextual knowledge repository 42 may be stored in a computing device that communicates with devices or components within and/or associated with the process plant 5. These devices or components generate process data/or other types of data as a result of the process plant 5 controlling the on-line process. In these implementations, the process plant-related data is not provided through a unidirectional data diode, and devices which receive process plant-related data from the contextual knowledge repository 42 may communicate with the devices or components within and/or associated with the process plant 5 that generated the process plant-related data to control on-line operation of the process plant 5. In this scenario, only devices authorized to interact with process control devices may receive process plant-related data from the contextual knowledge repository 42 (e.g., operator workstations, mobile workstations, etc.).

In any event, in FIG. 3, process plant-related data (e.g., process parameter data, product parameter data, configuration data, maintenance data, event data, historical data, environmental data, analysis data such as laboratory measurements. etc.) and process plant entities (e.g., controllers, field devices, process plants, process plant areas, tanks, pumps, mixers, heat exchangers, reactors, regenerators, control modules, function blocks, process flow modules, etc.) are represented by circles and relationships or connections between process plant-related data and/or process plant entities are represented by lines connecting the circles. For example, a first process plant entity 302 represents the Houston process plant. The first process plant entity 302 is connected to areas within the process plant (e.g., Plant Area A, Plant Area B) based on the areas being within the Houston process plant. Each area is connected to devices and/or components within the area, such as controllers, field devices, control modules, process plant equipment, etc. More specifically, Plant Area A is connected to CONTROLLER1, CNTL MOD PID1, TANK1, MIXER1, and PUMP1 each of which are located within Plant Area A or control process plant equipment in Plant Area A. Plant Area B is connected to HEAT EXCHANGER1 and VALVE1 each of which are located within Plant Area B. CONTROLLER1 is then connected to CNTL MOD PID1 based on CONTROLLER1 executing the control module CNTL MOD PID1. CONTROLLER1 is also connected to TANK1, MIXER1, and PUMP1 based on CONTROLLER1 controlling each of these pieces of process plant equipment. Additionally, CNTL MOD PID1 is connected to TANK1, MIXER1, and PUMP1 based on CNTL MOD PID1 being a control module that controls each of these pieces of process plant equipment. Further, CNTL MOD PID1 is connected to PRODUCT OUTPUT1 based on CNTL MOD PID1 causing PRODUCT OUTPUT1 to be generated based on control of TANK1, MIXER1, and PUMP1. PRODUCT OUTPUT1 may be gasoline for example. Moreover, TANK1 and PRODUCT OUTPUT1 are connected to process parameter data and product parameter data, respectively corresponding to TANK1 and PRODUCT OUTPUT1. More specifically, TANK1 is connected to process parameter data representing the fill level of TANK1, Alarm 1 and Alarm 2 each representing alarms corresponding to TANK1, and Product In1 which is a product provided as an input into TANK1 (e.g., kerosene). PRODUCT OUTPUT1 is connected to product parameter data representing the temperature, volume, density, pressure, and chemical composition of PRODUCT OUTPUT1.

While the contextual knowledge repository 42 stores a small amount of process plant-related data, this is for ease of illustration only. The contextual knowledge repository 42 may store indications of any number of process plant entities and any suitable amount of process plant-related data for each of the process plant entities across several process plants. In this manner, users may be able to receive data from multiple process plants so that the user may search over multiple sites. In addition to providing the process plant-related data from the contextual knowledge repository 42 as search results, the process plant-related data may be used for plant commissioning, particularly to resolve ambiguous naming conventions. In any event, the process plant-related data may include several types of disparate data such as configuration data, run-time data, maintenance data, analysis data, environmental data such as regulatory reporting data, diagnostic data, economic data for the process plant such as costs of equipment and materials, projected values of products produced by the plant, the amount of a product which is produced by the process plant over a particular time period, projected revenues and profit margins, etc., or any other suitable data related to the process plant.

To generate the contextual knowledge repository 42, the contextual knowledge miner 45 mines the data lake 40 to discover relationships between various content data stored in the data lake 40, and generates/modifies/updates the contextual knowledge repository 42 accordingly. For example, the contextual knowledge miner 45 may mine the data lake 40 to identify additional process parameter data for process parameters corresponding to TANK1. Then the contextual knowledge miner 45 may update the contextual knowledge repository 42 to include a connection between TANK1 and the additional process parameter data. In some implementations, when a change is made to the plant configuration such as a user adding a new control module to the process control system, the user may provide an instruction (e.g., via a user control at the user interface device) to the contextual knowledge miner 45 to regenerate the contextual knowledge repository 42 with the new plant configuration. In some scenarios, the user may provide an instruction to the contextual knowledge miner 45 to update the contextual knowledge repository 42 with the new plant configuration by adding only the changes to the plant configuration to the contextual knowledge repository 42. In other implementations, the contextual knowledge miner 45 may automatically analyze updates to the contextual knowledge repository 42 for example, when downloads to the on-line process plant occur, and determine whether to update the existing contextual knowledge repository 42 with changes to the plant configuration, or for example, if the changes are structural in nature, to regenerate the contextual knowledge repository 42 with the new plant configuration. The contextual knowledge repository 42 may also store time data regarding when plant configuration changes were added. For example, when a new or updated control module is downloaded to the on-line process plant, the contextual knowledge repository 42 may include the date and time of the download. Accordingly, a contextual record of the plant state when each plant configuration change occurs may be maintained based on the contextual knowledge repository 42. While the contextual knowledge repository 42 is depicted as a graph structure this is merely an exemplary embodiment and the entities in the contextual knowledge repository 42 may be connected in any suitable manner.

Process Plant Search Queries

As mentioned above, access mechanisms 48 within the edge-facing component 12 may provide process plant-related data to external systems 8. One example of an access mechanism may be a process plant search query server which obtains process plant search queries from external systems 8, such as user interface devices external to the process plant 5 (e.g., mobile devices, desktop computers, laptop computers, wearable devices, vehicle head units, etc.). The process plant search query server then obtains process plant-related data relevant to a process plant search query from the contextual knowledge repository 42 and generates process plant search results based on the obtained process plant-related data. More generally, the process plant search query server may obtain a request for process plant-related data from an application or other computing device, obtain at least some of the process plant-related data from the contextual knowledge repository 42 in response to the request, and provide the obtained process plant-related data to the application or other computing device. In some implementations, the request is a process plant search query, and the process plant search query server provides a subset of the process planted-related data to the application or other computing device as search results in response to the process plant search query.

Figure 4:
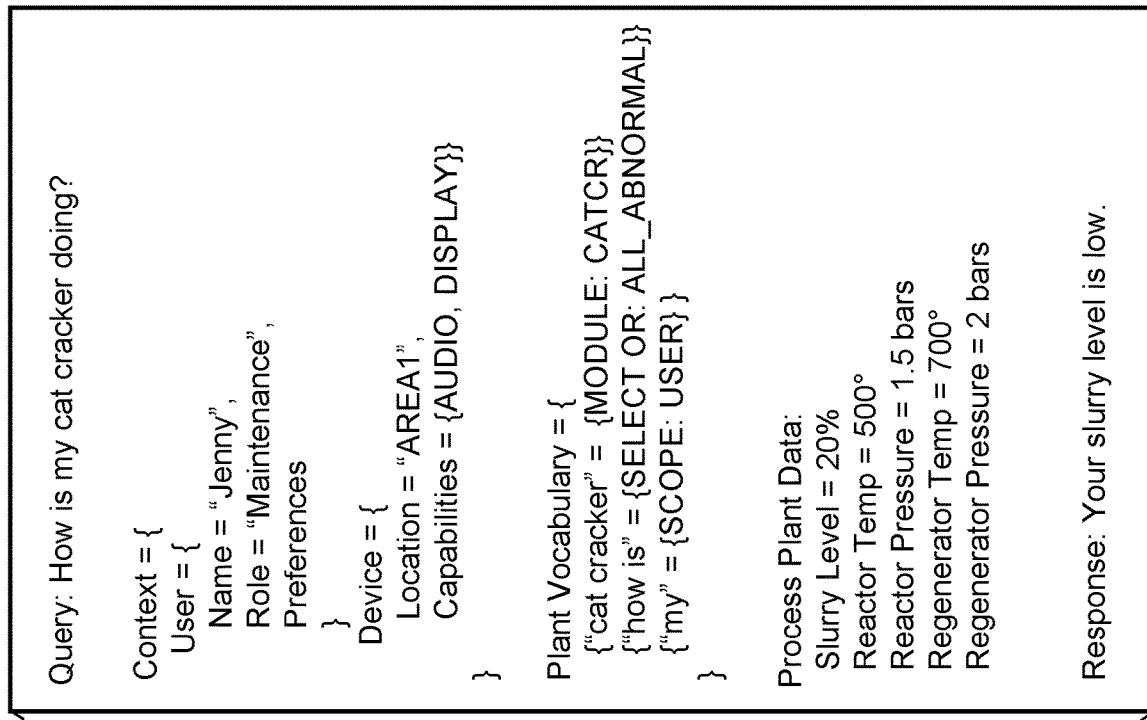
FIG. 4 illustrates a block diagram of an example process plant search query server.
Figure 4:
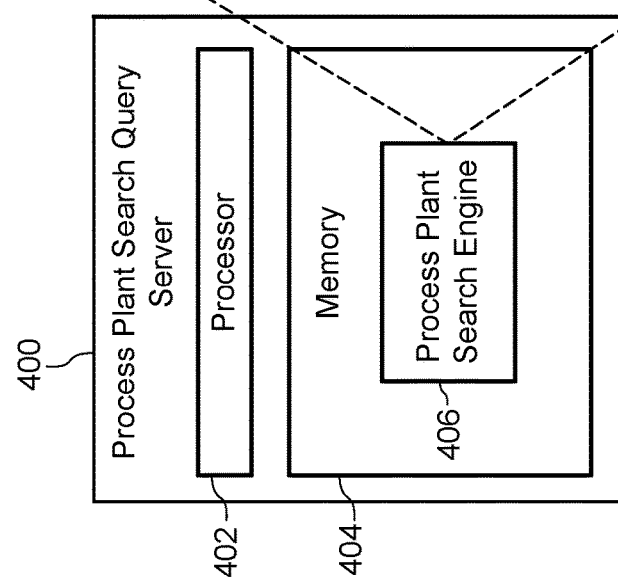

FIG. 4 illustrates a block diagram of example process plant search query server 400. The process plant search query server 400 server may be implemented as hardware having a processor 402, a memory 404 that executes a process plant search engine 406, and a communication unit for communicating with external systems 8 via one or more external communications networks, data networks, and/or links. The one or more external communications networks, data networks, and/or links may include any number of wired and/or wireless communications networks, data networks, and/or links, and may include any number of private and/or public networks and/or links. In other implementations, the process plant search query server 400 server may be implemented as software for executing the process plant search engine 406 on the hardware of the edge-facing component 12.

In some implementations, the process plant search query server 400 is an access mechanism 48 of the edge-facing component 12. In these implementations, the process plant search query server 400 obtains process plant-related data from the contextual knowledge repository 42 which is a local copy or duplicate of the process plant-related data generated within the process plant 5. Accordingly, the process plant search query server 400 does not directly interact with the process plant-related data generated within the process plant 5, and cannot communicate with controllers and/or other devices in the process plant 5 to control on-line operation of the process plant 5. In other implementations, the process plant search query server 400 is not part of the edge-facing component 12 and is a server device communicatively coupled to the process plant 5 and configured to communicate with controllers and/or other devices in the process plant 5 to control on-line operation of the process plant 5.

In any event, the process plant search engine 406 receives a process plant search query from a user interface device. The process plant search query may be any search query related to a process plant-related data and/or related to process plant entities within the process plant. For example, the process plant search query may be, "How is my cat cracker doing?" The process plant search engine 406 then analyzes/parses the process plant search query to identify the subject of the search query, context for the search query, and/or other information in the search query which may be used to filter a data set responsive to the search query. More specifically, the process plant search engine 406 may obtain indications of subjects and filters from a grammar module or plant vocabulary database included in the process plant search query server 400 or communicatively coupled to the process plant search query server 400. The grammar module or plant vocabulary database may store several subjects of process plant search queries and filters which modify the subjects to filter the search results. The grammar module or plant vocabulary database may also store several mappings of terms from process plant search queries which correspond to each subject and/or filter, such as synonyms or nicknames for the subject or filter. For example, for the subject "MODULE: CATCR," the grammar or plant vocabulary may store the corresponding terms, "cat cracker," "cat cracker module," "cat cracker control module," "catalytic cracking module," "fluid catalytic cracking module," etc.

The process plant search engine 406 may also identify that the process plant search query was provided in a natural language format, for example, based on terms such as "how is" and "my." As a result, the process plant search engine 406 recognizes the conversational nature of the process plant search query which may be used as context for follow-up queries by the user. For example, because the process plant search engine 406 recognizes the process plant search query as conversational, if the user provides an additional process plant search query, such as, "What is the efficiency?" the process plant search engine 406 identifies based on the context, that the additional process plant search query is for the efficiency regarding the cat cracker and not another module. In response to identifying a natural language format of a process plant search query, the process plant search engine 406 uses the process plant search query as context for additional process plant search queries by the user within a threshold time period of the process plant search query (e.g., five minutes, ten minutes, an hour, etc.).

The process plant search engine 406 may then match each of the terms in the process plant search query to one of the subjects or filters. In some implementations, the process plant search engine 406 first identifies one or more terms within the process plant search query which correspond to the subject of the process plant search query. Then the process plant search engine 406 identifies filters which correspond to the remaining terms as well as context which may be used to filter the data set further. The process plant search engine 406 may identify an exact match of one or more terms in the process plant search query to a subject included in the grammar module or plant vocabulary database.

In other implementations, the process plant search engine 406 identifies a likelihood that one or more terms in the process plant search query correspond to a subject from several candidate process plant search query subjects included in the grammar module or plant vocabulary database. Then the process plant search engine 406 identifies the subject and corresponding terms having the highest likelihood. For example, the process plant search engine 406 may compare a first term in the process plant search query to each of the candidate process plant search query subjects in the grammar module or plant vocabulary database and identify likelihoods that the first term corresponds to each of the candidate process plant search query subjects. Then the process plant search engine 406 may compare a first and second term in the process plant search query to each of the candidate process plant search query subjects in the grammar module or plant vocabulary database and identify likelihoods that the first and second term correspond to each of the candidate process plant search query subjects. The process plant search engine 406 may also compare the second term alone to each of the subjects in the grammar module or plant vocabulary database and identify likelihoods that the second term corresponds to each of the candidate process plant search query subjects.

The process plant search engine 406 may continue to compare each of the terms alone and in combination to identify a set of one or more terms having the highest likelihood of corresponding to one of the candidate process plant search query subjects in the grammar module or plant vocabulary database. As shown in FIG. 4, the process plant search engine 406 identifies the terms "cat cracker" as corresponding to the subject "MODULE: CATCR."

The process plant search engine 406 then identifies filters from the grammar module or plant vocabulary database which correspond to the remaining terms. The filters may be used to filter the data set obtained in response to the identified subject. In this example, the process plant search engine 406 may obtain a set of process plant-related data included in the contextual knowledge repository 42 having connections to MODULE:CATCR. The filters may be used to remove process plant-related data from the set. As with the subject, the process plant search engine 406 may identify an exact match of one or more remaining terms in the process plant search query to a filter included in the grammar module or plant vocabulary database. In other implementations, the process plant search engine 406 identifies a likelihood that one or more remaining terms in the process plant search query correspond to a filter included in the grammar module or plant vocabulary database. Then the process plant search engine 406 identifies the filter and corresponding remaining terms having the highest likelihood or a likelihood above a likelihood threshold.

The process plant search query may include several filters each having a different set of one or more remaining terms with a likelihood of corresponding to the filter above a likelihood threshold. As shown in FIG. 4, the process plant search engine 406 identifies the term "my" as corresponding to the filter "SCOPE: USER." The filter "SCOPE:USER" may be used to filter the set of process plant-related data such that only process plant-related data corresponding to one particular MODULE:CATCR of several entities named MODULE:CATCR in the contextual knowledge repository 42 remains. The particular MODULE:CATCR is the MODULE:CATCR that the user operates, maintains, is responsible for, etc., according to the context, as described in more detail below. The process plant search engine 406 identifies the term "how is" as corresponding to the filter "ALL_ABNORMAL." The filter "ALL_ABNORMAL" may be used to filter the set of process plant-related data such that only process plant-related data indicating an abnormal condition and corresponding to the one particular MODULE:CATCR remains.

As shown in FIG. 4, the example process plant-related data corresponding to the particular MODULE:CATCR that the user operates, maintains, is responsible for, etc., includes a slurry level of 20%, a reactor temperature of 500°, a reactor pressure of 1.5 bars, a regenerator temperature of 200°, and a regenerator pressure of 2 bars. The slurry level in the contextual knowledge repository 42 may include a connection to an abnormal condition for example based on the slurry level being below a threshold slurry level. Accordingly, the process plant search engine 406 may filter the reactor temperature, reactor pressure, regenerator temperature, and regenerator pressure from the set of process plant-related data such that only the slurry level remains.

In addition to identifying subjects and filters for the process plant search query, the process plant search engine 406 identifies context. The context may include user information for the user submitting the process plant search query, such as the name of the user, the name and location of the process plant where the user works, the organizational role of the user within the process plant, preferences for the user, a search history of previous search queries for the user, etc. The process plant search engine 406 may obtain the user information from a user profile for the user included in a user database, for example. The user may provide login information which may be used by the process plant search engine 406 to access the user information. Additionally, the context may include device information for the device in which the user submits the process plant search query, such as the location of the device which may include a location within a process plant or may be an external location, the capabilities of the device (e.g., audio, display, microphone, applications executing on the device, etc.), the type of the device, the size of the device, etc. The location of the device may allow for location-based process plant search queries, such as "Identify the valve in front of me." Moreover, the context may include the time in which the process plant search query is submitted.

The process plant search engine 406 may further filter the set of process plant-related data according to the context. For example, as described above one of the filters corresponding to the process plant search query is "SCOPE:USER." Based on the name and location of the process plant where the user works and the organizational role of the user within the process plant, the process plant search engine 406 may identify the MODULE:CATCR of several instances of MODULE:CATCR in the contextual knowledge repository 42 that the user operates, maintains, is responsible for, etc. For example, the context may indicate that the user works in Area 1 of the Houston plant which has one MODULE:CATCR. Accordingly, the process plant search engine 406 may filter the data set to include only process plant-related data corresponding to the MODULE:CATCR which is in Area 1 of the Houston plant. In other implementations, the user may include the name or location of the process plant in the process plant search query. The process plant search engine 406 may then use the name or location of the process plant as context for further process plant search queries by the user within the same conversation, such as within threshold time period, or for any subsequent process plant search queries by the user. The device context may be used to determine the number of search results for the process plant search engine 406 to return. For example, if the device is a desktop computer, laptop computer, operator workstation, etc., the process plant search engine 406 may return a full set of search results. If the device is a mobile device or vehicle head unit, the process plant search engine 406 may reduce the number of search results to one or some other threshold number.

In any event, the process plant search engine 406 transforms the filtered process plant-related data into process plant search results. In the example described above, the filtered process plant-related data includes a slurry level of 20% for the MODULE:CATCR in Area 1 of the Houston plant. Accordingly, the process plant search engine 406 may generate a search result as an audio response (e.g., via a text to speech engine) or a text response in a natural language format, such as "Your slurry level is low." The process plant search engine 406 may transform a subset of the filtered process plant-related data into a process plant search result by obtaining an introductory statement, such as "Good morning," "Good afternoon," "Happy Holiday!" etc., from the grammar module or plant vocabulary based on the time of day/year and/or the user's name. The process plant search engine 406 may also obtain a natural language response to the process plant search query from the grammar module or plant vocabulary, such as "Your slurry level is . . . " "Abnormal conditions in your cat cracker include . . . " "Your cat cracker is performing well! A few things to watch out for are . . . " In other implementations, the process plant search engine 406 may generate a search result as a link to a process flow module or control module for the MODULE: CATCR in Area 1 of the Houston plant which may highlight the slurry level, or a link to detailed information regarding the slurry level. In this example, the process plant search engine 406 returns a single process plant search result. However, this is merely one example scenario. In other scenarios, the process plant search engine 406 may return any number of process plant search results corresponding to any amount of process plant-related data responsive to the process plant search query.

While "How is my cat cracker doing?" is one example of a process plant search query, the process plant search query server 400 may obtain any suitable process plant search query and generate process plant search results. Other example process plant search queries may include queries regarding a particular mode of operation, queries regarding abnormal conditions or a particular abnormal condition, queries for modules in a specified portion of a module hierarchy, queries for process parameters having a particular name and/or value, queries for modules with alarms or alarms having a particular priority, queries regarding a particular process plant entity or group of process plant entities, queries regarding a product produced by process plant entities, queries regarding events within the process plant, queries regarding configuration data such as queries regarding instances of classes, or any other suitable queries related to the process plant.

Additionally, in some implementations, the user may allow for the process plant search query server 400 to provide unsolicited voice or display information regarding the process plant to the user's user interface device (e.g., by selecting a user control on the user interface device to receive unsolicited process plant-related data). The unsolicited voice or display information regarding the process plant may include critical or safety-related alarm information regardless of the current interactions with the user. The process plant search query server 400 may identify a set of process plant entities for the user. For example, the set of process plant entities may be identified based on the user's organizational role or may be selected by the user. The process plant search query server 400 may then periodically (e.g., every 30 seconds, every minute, every five minutes, etc.) search the contextual knowledge repository 42 for critical or safety-related alarm information related to the identified set of process plant entities. When the process plant search query server 400 identifies critical or safety-related alarm information related to one of the identified set of process plant entities, the process plant search query server 400 provides an indication of the critical or safety-related alarm information to the user interface device in an audio or textual/graphical format regardless of whether the user provided process plant search queries regarding the critical or safety-related alarm information, the set of process plant entities, or provided any process plant search queries at all. For example, the user may provide process plant search queries regarding a boiler unit and distillation column. In response to identifying a critical or safety-related alarm information related to a safety system in an area of the process plant 5 that the user operates, the process plant search query server 400 may interrupt the process plant search query/process plant search results sequence and instead provide the critical or safety-related alarm information related to the safety system to the user interface device.

Additionally, the user may request voice alerts or notification to be provided to the user interface device in response to a particular event or condition occurring within the process plant. The process plant search query server 400 may then periodically or continuously determine whether the particular condition is satisfied or event occurs within the process plant 5. When the particular condition is satisfied or event occurs, the process plant search query server 400 may provide the voice alert or notification to the user interface device without any further requests or process plant search queries by the user. For example, the user may want to know when the process variable value for TT-102 rises above 70%. The process plant search query server 400 may periodically or continuously obtain the process variable value for TT-102, for example from the contextual knowledge repository 42. When the process variable value exceeds 70%, the process plant search query server 400 may provide a voice alert to the user interface device that the process variable value for TT-102 is 71%, for example.

Figure 5:
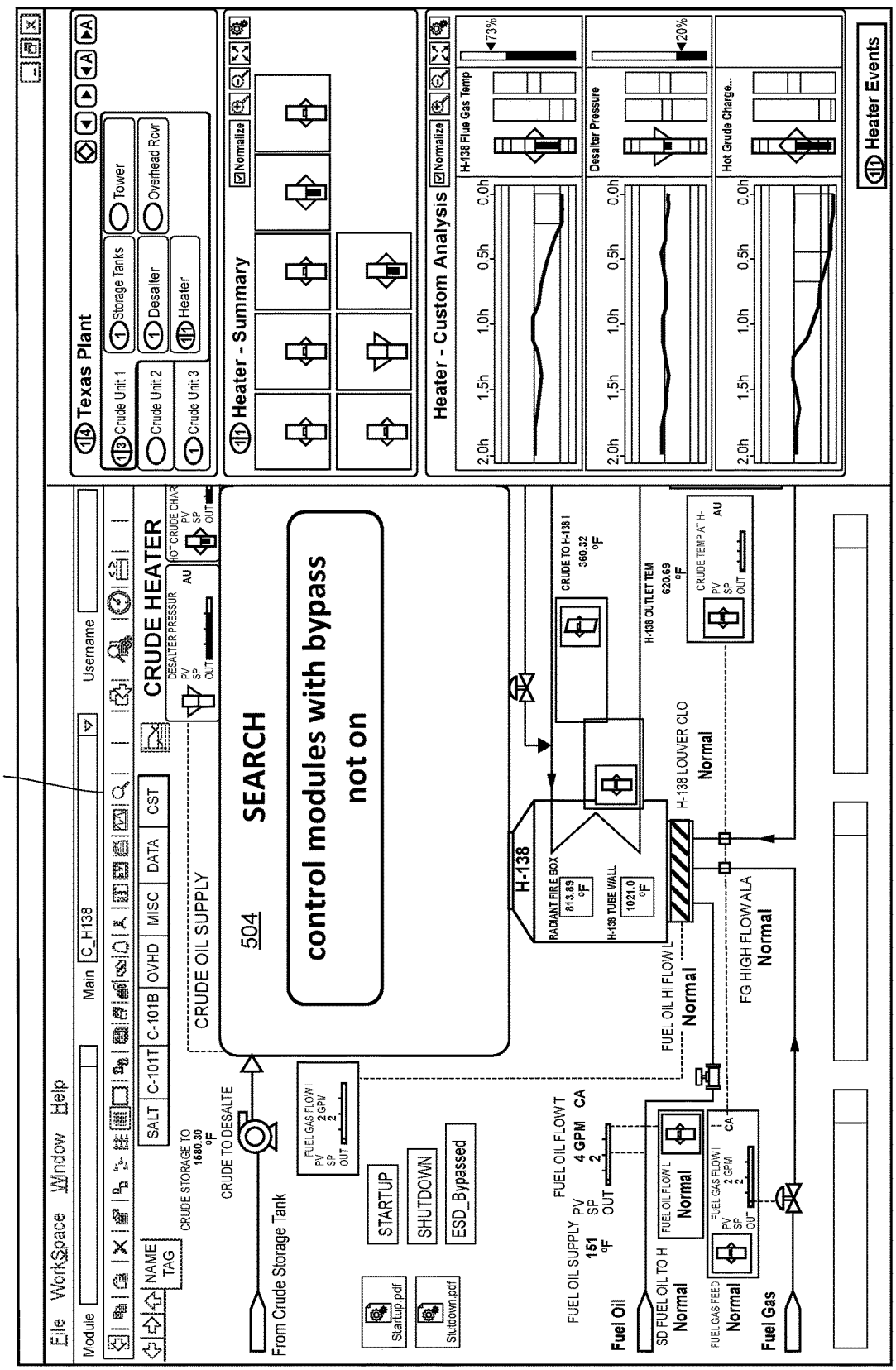
FIG. 5 illustrates an example process plant display including a search bar for entering process plant search queries.

The process plant search query server 400 receives a process plant search query from a user interface device which may be within or external to the process plant 5. FIG. 5 illustrates an example process plant display 500 which may be presented on the user interface device. The user interface device may be communicatively coupled to the process plant 5, such that the user may control devices or components within the process plant 5 via user controls on the process plant display 500. In other implementations, the user interface device is not communicatively coupled to the process plant 5 and the data presented on the process plant display 500 is from a local copy or duplicate of the process plant-related data within the process plant 5. In any event, the process plant display 500 may include a user control 502 such as a search icon, which when selected causes the process plant display 500 to present a search bar 504 for entering process plant search queries. In some implementations, the process plant display 500 is presented via a process plant application or process plant search application executing on the user interface device. The user may enter the process plant search query via text input or audio input via a microphone, such as "control modules with bypass not on." The process plant search query may be related to the graphical information presented in the process plant display 500, such as a control module, faceplate, process flow module, process plant entities, etc. In some implementations, the user interface device may provide an indication of the control module, process flow module, faceplate, process plant entities, etc., included in the process plant display 500 to the process plant search query server 400 as context for the process plant search query. In other scenarios, the process plant search query is not related to the graphical information presented in the process plant display 500.

The process plant application or process plant search application may store previous process plant search queries entered by the user and may include user controls for the user to select one of the previous process plant search queries without having to repeat the text or audio input. In some implementations, the process plant application or process plant search application may automatically resubmit previous process plant search queries periodically or in any suitable manner to receive updated search results.

Figure 6:
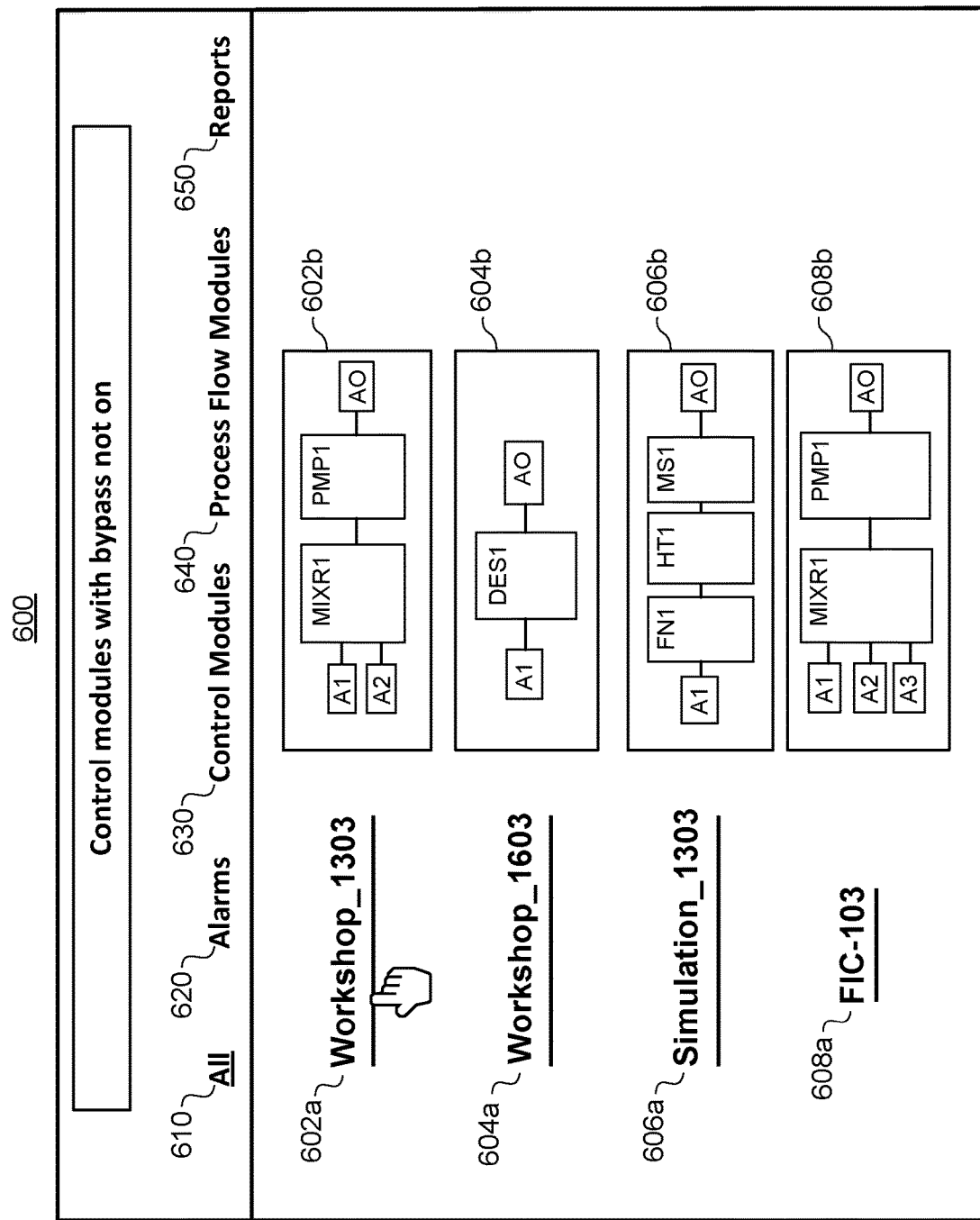
FIG. 6 illustrates an example process plant search results display including process plant search results in response to a process plant search query.

The process plant search query server 400 then receives the process plant search query as well as context for the process plant search query, such as user information, device information, a search history of previous search queries for the user, indications of graphical information presented on the process plant-related data when the process plant search query is submitted, etc. The process plant search query server 400 may then identify the subject of the process plant search query, "control modules with bypass not on" as CRTLMOD from the terms "control modules" in the process plant search query, and may identify a filter as BYPASS:is_not:On from the terms "bypass not on." In some implementations, the process plant search query server 400 may identify additional filters from the context, such as control modules within a particular process plant in which the user operates, maintains, is responsible for, etc., a particular area of the process plant in which the user operates, maintains, is responsible for, etc., a particular area of the process plant in which the user previously inquired about, or a particular area of the process plant currently presented on the user's process plant display 500. In any event, the process plant search query server 400 then identifies each of the control modules with bypass not on from the contextual knowledge repository 42 as well as process plant-related data for each of the identified control modules. The process plant search query server 400 generates a process plant search result for each identified control module/process plant-related data for the control module and provides the process plant search results for display on the user interface in a search results display. An example process plant search results display 600 which may be presented on the user interface device is illustrated in FIG. 6.

Figure 7:
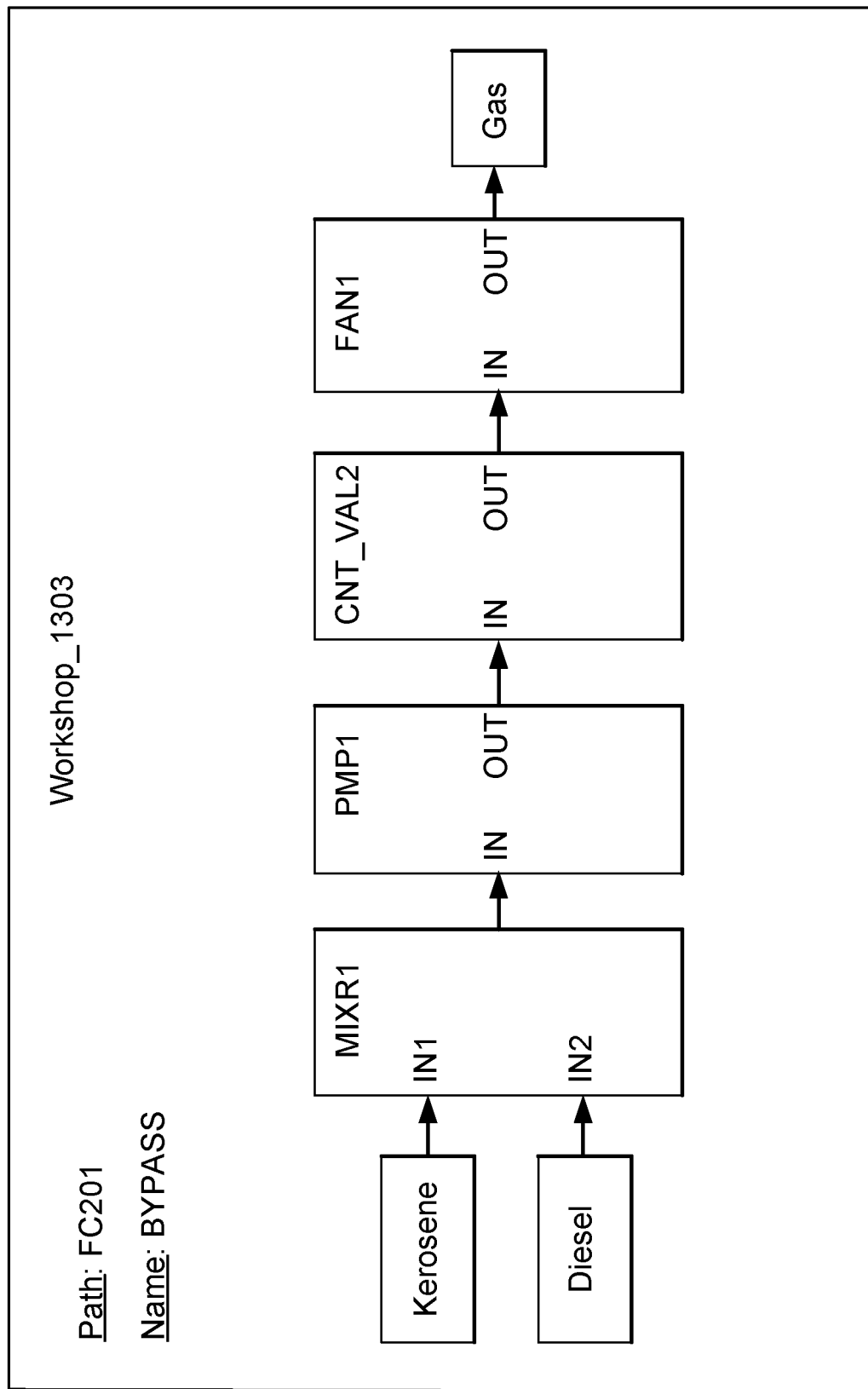
FIG. 7 illustrates an example detailed search result display which may be presented in response to a selection of a process plant search result included in FIG. 6.

The process plant search results display 600 includes indications of a set of process plant search results 602a-608a in response to the process plant search query, "control modules with bypass not on." Each indication of a process plant search result 602a-608a may include a name of the process plant search result (e.g., Workshop_1303) with a link to detailed information regarding the process plant search result. Additionally, each indication of a process plant search result 602a-608a may include a thumbnail image or preview 602b-608b of the detailed information regarding the process plant search result. For example, the first process plant search result 602a, Workshop_1303, is a control module and the thumbnail image or preview corresponding to the first process plant search result 602b is a thumbnail image of a graphical representation of the control module. When the user selects the first process plant search result 602a (e.g., by clicking on or touch-selecting the indication of the first process plant search result 602a or the thumbnail or preview corresponding to the first process plant search result 602b), the user interface device may present a complete view of the graphical representation of the control module in a detailed search result display 700 as shown in FIG. 7.

The detailed search result display 700 may also include other information about the control module, such as the name of the control module, the path of the control module, the names and/or paths of inputs and outputs to the control module, the names and/or paths of process plant entities controlled by the control module, the name and/or path of the controller executing the control module, product parameter data for products input and/or output by the control module, process parameter data for process plant entities controlled by the control module, or any other suitable information regarding the control module. As described above, when the user interface device is external to the process plant 5 and/or is unauthorized to communicate with devices or components that control on-line operation of the process plant 5, the selectable link to detailed information is a selectable link to a local copy or duplicate of the process plant-related data within the process plant 5, such that user interactions with the duplicate of the process plant-related data do not effect run-time operation of the process plant 5.

In some implementations, the detailed search result display 700 may include a video feed, such a live video feed of a process plant entity or process plant area corresponding to the search result. For example, if the search result is an alarm for a particular process plant entity, the detailed search result display 700 may include a live video feed of the process plant entity (e.g., a mixer). In another example, if the search result is a summary of an area of the process plant, the detailed search result display 700 may include a live video feed of the process plant area. Still further, the detailed search result display 700 may include faceplates, detail and primary control displays, control hierarchies, process flow modules, images/video of the process plant, images/video of an area of the process plant, displays of process plant entities, map representation of a process plant or area of a process plant, graphs, charts or tables for a process parameter or product parameter value, configuration displays, alarm displays, etc.

Turning back to FIG. 6, the process plant search query server 400 may select the number of process plant search results to include in the process plant search results display 600 based on the size and/or type of the user interface device. If the size of the user interface device is less than a threshold size or the device type is a particular type of a predetermined set of device types (e.g., a mobile device, a vehicle head unit, etc.), the process plant search query server 400 may provide a single process plant search result to include in the process plant search results display 600.

Figure 8:
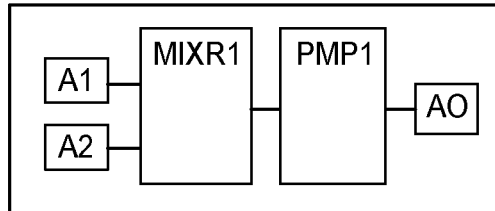
FIG. 8 illustrates another example process plant search results display including a process plant search result in response to a process plant search query.

FIG. 8 illustrates a process plant search results display 800 for a mobile device having a single process plant search result. On the other hand, if the size of the user interface device is not less than the threshold size or the device type one of a predetermined set of device types, the process plant search query server 400 may provide a set of process plant search results to include in the process plant search results display 600. In other implementations, the process plant search query server 400 selects a number of process plant search results to include in the process plant search results display 600 which is in proportion to the size of the user interface device. For example, the process plant search query server 400 may provide 10 process plant search results to include in the process plant search results display 600 when the user interface device is above a first threshold size but less than a second threshold size. The process plant search query server 400 may provide 20 process plant search results to include in the process plant search results display 600 when the user interface device is above a second threshold size but less than a third threshold size, and so on. In yet other implementations, the process plant search results display 600 includes a first set of process plant search results on a first page, and additional sets of process plant search results on subsequent pages which the user may access via user controls on the process plant search results display 600, such as back and forward arrows.

In other implementations, the process plant search query server 400 provides the set of process plant search results to the user interface device, and the user interface device adjusts the presentation of the set of process plant search results based on the size and/or type of the user interface device. For example, if the user interface device is a mobile device or vehicle head unit, the user interface device may select a single search result of the set of process plant search results to present in the process plant search results display 600. If the user interface device is a desktop computer or has a size at or above a threshold size, the user interface device may present each of the set of process plant search results in the process plant search results display 600.

In some implementations, the process plant search query server 400 may select the format in which to provide the process plant search results based on the capabilities of the user interface device. If the user interface device has audio capabilities but does not have a display, the process plant search query server 400 may provide the process plant search results to the user interface device in an audio format. If the user interface device has a display but does not have audio capabilities, the process plant search query server 400 may provide the process plant search results to the user interface device in a text/graphical format. If the user interface device has a display and audio capabilities, the process plant search query server 400 may provide the process plant search results to the user interface device in both a text/graphical format and an audio format.

The process plant search results display 600 may also include indications of categories 610-650 for obtaining process plant search results that correspond to a particular category. In the example process plant search results display 600, the categories include: All 610, Alarms 620, Control Modules 630, Process Flow Modules 640, and Reports 650. In the example process plant search results display 600, the All category 610 is selected and accordingly the process plant search results being presented include process plant search results for all of the categories. In response to a selection by the user of one of the other categories 620-650, the process plant search results display 600 may present process plant search results responsive to the process plant search query which correspond to the selected category. For example, if the user selects the category Reports 650, the process plant search results display 600 may present a subset of the process plant search results which include a report or are related to a report, such as a report regarding one of the control modules with bypass not on.

In some implementations, the process plant search query server 400 generates each of the categories and assigns subsets of the process plant search results to each category. The process plant search query server 400 may assign a particular process plant search result to a category based on the process plant-related data included in the process plant search result and/or based on connections from the process plant-related data to other process plant-related data or process plant entities in the contextual knowledge repository 42. For example, if a particular control module in the contextual knowledge repository 42 has connections with alarms, the process plant search query server 400 may assign the control module to the Alarms category 620.

In some implementations, the categories may be independent of the process plant search query and may be the same categories for any process plant search query. In other implementations, the process plant search query server 400 generates a set of categories specific to each process plant search query based on the set of process plant search results responsive to the process plant search query. For example, for the process plant search query, "control modules with bypass not on," the process plant search query server 400 may determine that the set of search results include control modules in three different area of a process plant. Accordingly, the process plant search query server 400 may generate a different category for each area of the process plant, and assign a subset of the process plant search results to each category.

Also in some implementations, the process plant search query server 400 may rank and/or score each of the process plant search results. The process plant search results 602a-608a may then be presented in a ranked order in the process plant search results display 600. For example, the process plant search result 602a ranked the highest or having the highest score may be presented at the top of the process plant search results display 600. When the process plant search query server 400 selects a single process plant search result to include in the process plant search results display 600, the process plant search query server 400 may select the highest ranking process plant search result. In another example, when the process plant search query server 400 selects a threshold number of process plant search results to include in the process plant search results display 600 (e.g., five), the process plant search query server 400 may select process plant search results ranked at or above the threshold number.

The process plant search query server 400 may assign relevance scores to each of the process plant search results according to relevance to the process plant search query. The relevance to the process plant search query may be based on how closely a process plant search result corresponds to the process plant search query. In some implementations, the process plant search query server 400 may assign relevance scores according to importance or priority for each of the process plant search results. For example, for a process plant search query having alarms as the subject, the process plant search query server 400 may determine that high priority or critical alarms have higher relevance to the process plant search query than low priority alarms. Accordingly, the process plant search query server 400 may assign higher scores to process plant search results corresponding to high priority or critical alarms and lower scores to process plant search results corresponding to low priority alarms.

Also in some implementations, such as for example, if one of the filters is a time period (e.g., alarms within the previous eight hours), the process plant search query server 400 may assign relevance scores based on recency. The process plant search query server 400 may assign higher scores to process plant search results corresponding to events that happened more recently. More specifically, the process plant search query server 400 may assign a higher relevance score to a search result corresponding to an alarm which triggered one hour before the process plant search query than to a search result corresponding to an alarm which triggered six hours before the process plant search query.

The process plant search query server 400 may also assign relevance scores based on the context. More specifically, if the process plant search query is "modules on boiler unit" for example, and the user's organizational role within the process plant indicates that the user works closely with one particular boiler unit, then the process plant search query server 400 may assign higher relevance scores to modules for that one particular boiler unit than for modules corresponding to other boiler units.

Still further, the process plant search query server 400 may assign relevance scores to each process plant search result based on the number or proportion of filters having conditions that the process plant search result satisfies. For example, if the process plant search query includes three filters, process plant search results which satisfy the conditions for all three of the filters may be assigned higher relevance scores than process plant search results which satisfy only two of the three filters. In some implementations, the process plant search query server 400 only generates process plant search results which satisfy the conditions of each of the filters in the process plant search query. In other implementations, the process plant search query server 400 generates process plant search results which satisfy the conditions of at least a threshold number or percentage of the filters in the process plant search query. For example, if the process plant search query server 400 determines that 10 process plant search results may be provided for display according to the device type or size of the user interface device and only five process plant search results satisfy the conditions of each of the filters, the process plant search query server 400 may identify additional process plant search results that do not satisfy the conditions of one of the filters. These additional process plant search results may be assigned lower relevance scores than the process plant search results that satisfy the conditions of each of the filters.

In some implementations, the process plant search query server 400 assigns relevance scores to each of the process plant search results based on any suitable combination of importance, recency, context, the number of filters having conditions that a process plant search result satisfies, or any other suitable factor related to relevancy. The process plant search query server 400 may then rank the process plant search results in order of the relevance scores with the process plant search result having the highest relevance score ranked the highest.

In some implementations, the rankings may also be used to resolve ambiguous process plant search queries and/or provide recommendations or follow-up questions to the user regarding the process plant search query. For example, the user may provide a process plant search query regarding TT102. While the process plant search query server 400 may not be able to identify TT102 in the contextual knowledge repository 42, the highest ranking process plant search result may be for TC102. Accordingly, the process plant search query server 400 may provide a recommendation to the user to generate a process plant search query for TC 102, or may ask the user whether the process plant query was meant to be for TC 102. When the process plant search query server 400 receives an ambiguous process plant search query or is unable to identify the subject of the process plant search query, the process plant search query server 400 may identify the closest match or subject and may provide the closest match or subject to the user as a recommendation/corrective action.

Presentation of Process Plant-Related Data

In addition to providing process plant search results in response to process plant search queries, the contextual knowledge repository 42 may be used to provide process plant-related data to be presented by user interface devices which are not communicatively coupled to the process plant, such as mobile devices, vehicle head units, laptop computers, desktop computers, etc. In this manner, process plant personnel may remotely monitor on-line operation of the process plant without the security and safety risks of remotely communicating with devices within the process plant 5.

As mentioned above, in this implementation, the contextual knowledge repository 42 is included in an edge-facing component 12 of the edge gateway system 1. The edge-facing component 12 is connected to a field-facing component 12 of the edge gateway system via a unidirectional data diode 15 which obtains data from data sources 30 within the process plant 5, but does not allow for communication from the edge-facing component 12 to the field-facing component 10 and into the process plant 5. Accordingly, in this implementation, the process plant-related data included in the contextual knowledge repository 42 is from a local copy or a duplicate of the process plant-related data within the process plant 5, such that changes to the duplicate of the process plant-related data presented on a user interface device do not alter the run-time operation of the process plant 5. The user interface devices do not directly interact with the process plant-related data generated within the process plant 5, and cannot communicate with controllers and/or other devices in the process plant 5 to control on-line operation of the process plant 5. In this manner, users may remotely view process flow modules, control modules, faceplates, process plant entities, process parameter data, product parameter data, environmental data, maintenance data, analysis data, diagnostic data, etc., as if they were at their operator workstations, mobile workstations, or any other suitable user interface device within the process plant 5.

The process plant search query server 400 or any other suitable access mechanism 48 within the edge-facing component 12 may provide the process plant-related data to an application or other computing device in response to a request from the application or other computing device. For example, a user interface device may execute a process plant application that requests process plant-related data from the contextual knowledge repository 42 via an access mechanism 48 such as the process plant search query server 400. The process plant application may also obtain user identification information for the user such as user login information, and may provide the user identification information and device information to the edge-facing component 12 for context, so that the edge-facing component 12 provides a subset of the process plant-related data which is related to the organizational role of the user, for example. The subset of the process plant-related data may also be related to the process plant where the user is employed, such as the Corpus Christi plant.

Figure 9:
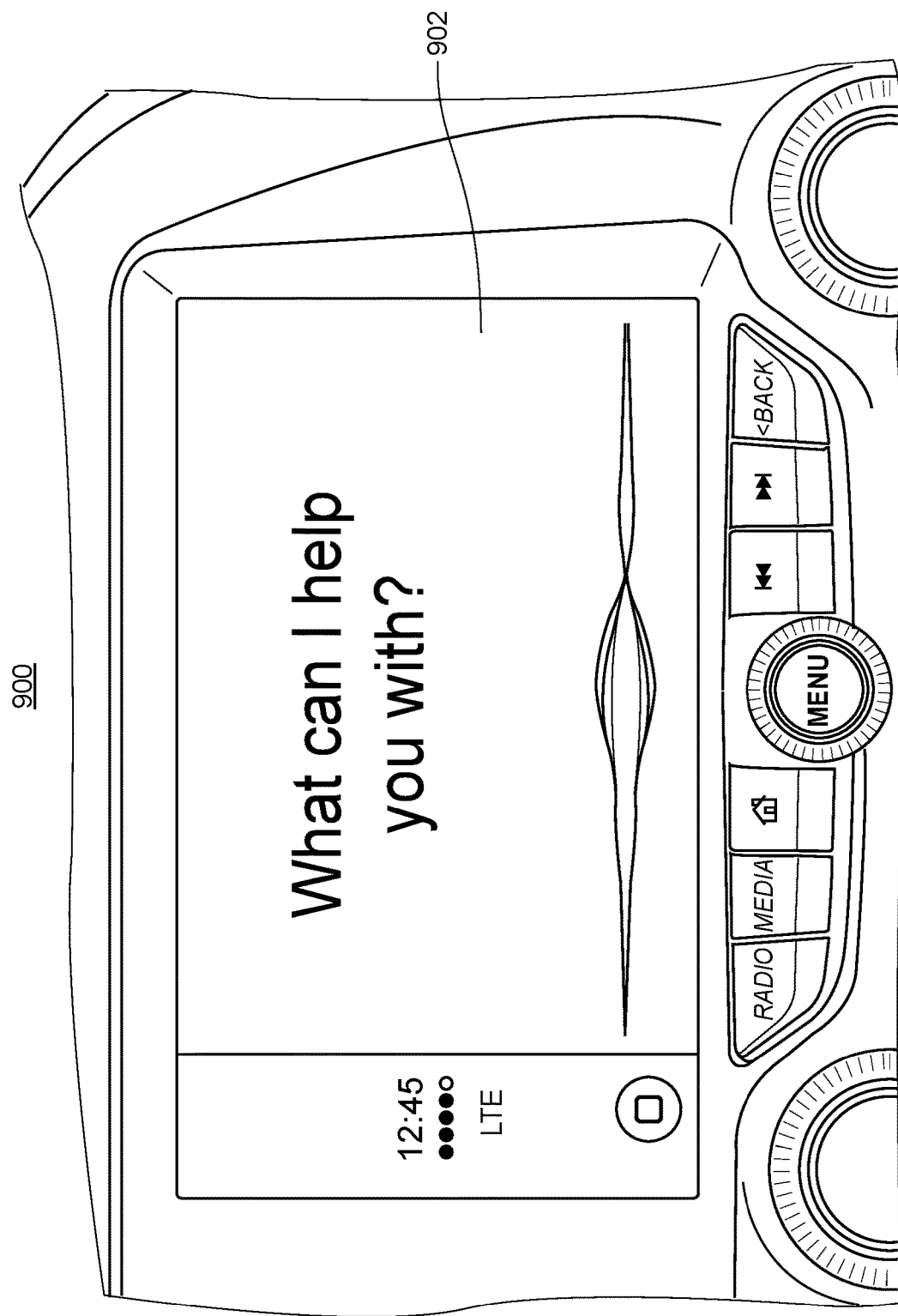
FIG. 9 illustrates a display of a vehicle head unit for presenting process plant-related data at a remote location from the process plant.
Figure 10:
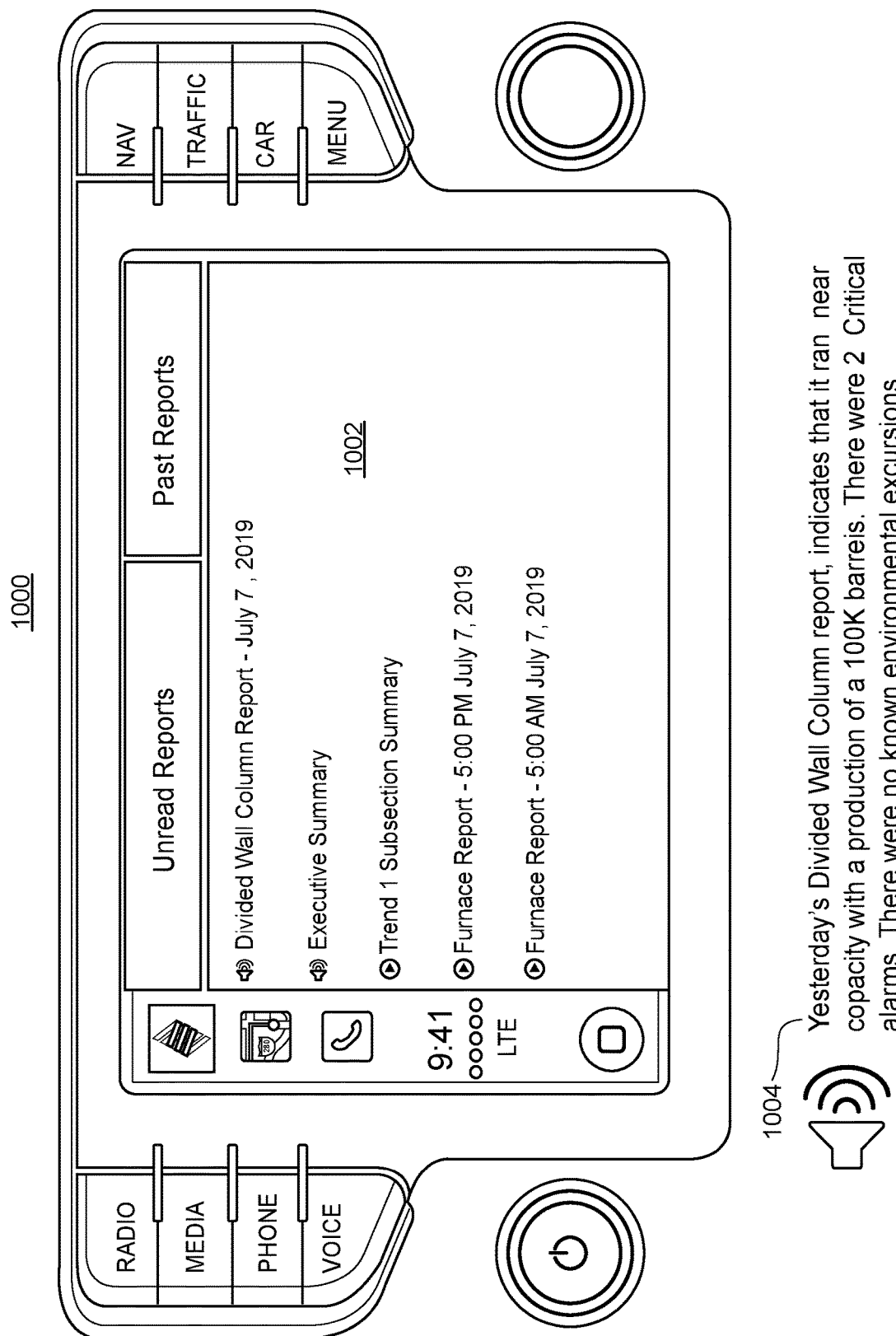
FIG. 10 illustrates example process plant-related data presented on the vehicle head unit.
Figure 11:
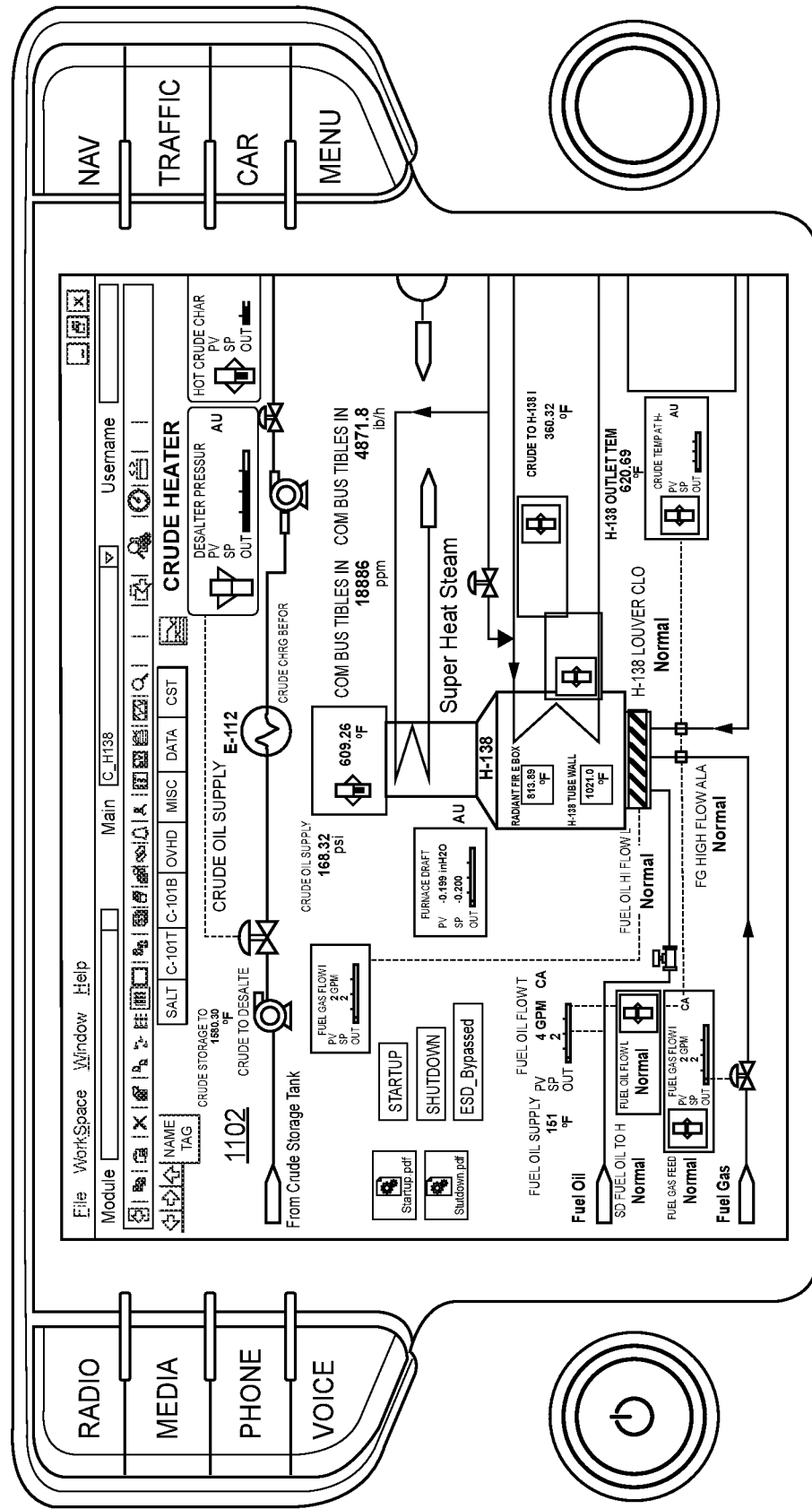
FIG. 11 illustrates another example of process plant-related data presented on the vehicle head unit.

FIG. 9 illustrates an example vehicle head unit 900 for presenting process plant-related data at a remote location from the process plant 5. The vehicle head unit 900 may execute a process plant application and may include a display 902 and speakers for providing graphical and audio output, hardware input controls for entering alphanumeric characters or providing other user input, software input controls for entering alphanumeric characters or providing other user input via a touch-screen, and/or a microphone for receiving audio input, such as a process plant search query. As shown in FIG. 9, the display 902 includes a prompt requesting the user to provide a request related to the process plant, such as a process plant search query. Accordingly, the user may provide an audio request with voice input via the microphone or may provide a text request via the hardware or software input controls. In some implementations, the process plant application may include a pre-stored voice prompt which causes the process plant application to receive and analyze the user's voice input via the microphone. For example, the pre-stored voice prompt may be "Hey, DeltaV." In response to receiving the voice input, "Hey, DeltaV," the process plant application may receive and analyze subsequent voice input from the user to generate process-plant data in a response to the user's request. The process plant application may also identify the user's voice via voice recognition techniques, such that only the user can provide voice input to the process plant application. Voice input from other users may not be analyzed since the process plant application would not identify the voice input as corresponding to the user. In other implementations, the display 902 may include default process-plant related data corresponding to the user or a process plant display of a process flow module or control module corresponding to the user, as shown in FIGS. 10 and 11 respectively, and described in more detail below. For example, the default process-plant related data may include reports generated for the user within a particular time period regarding process plant entities related to the user's organizational role, updates on process plant entities that the user operates, maintains, is responsible for, etc., alarms or critical information for these process plant entities, etc. The default process flow module or control module corresponding to the user may include a process flow module or control module that the user most recently viewed, or a process flow module or control module that includes process plant entities related to the user's organization role, such as process plant entities that the user operates, maintains, is responsible for, etc.

In an example scenario, in response to the prompt included on the display 902, the user provides the voice input, "Hey, DeltaV. Present my reports," or "Hey, DeltaV. Give me my divided wall column report." In response to the voice input, the vehicle head unit presents a process plant report display 1000 as shown in FIG. 10. In some implementations, the process plant report display 1000 may be presented as default process-plant related data without a request from the user. More specifically, the edge-facing component 12 may periodically generate reports for the user specific to the user's organizational role. The user may also be able to customize the reports via user controls on the vehicle head unit 900 to select particular control modules, process plant entities, process plant areas, etc., for which to receive reports. In any event, the process plant report display 1000 may include an indication of unread reports 1002 and read reports. Each indication of an unread report 1002 may include the title of the report and a link for selecting the report to view the report or to receive an audio version of the report. For example, the user may touch-select the audio control corresponding to the Executive Summary to receive an audio version of the Executive Summary or the user may touch-select the Executive Summary to receive a graphical version of the Executive Summary. In the example scenario, the user provides the voice input, "Hey, DeltaV. Present my reports," or "Hey, DeltaV. Give me my divided wall column report," to receive graphical and/or audio versions of the divided wall column report. In response, the vehicle head unit 900 presents an audio version of the divided wall column report 1004 such as, "Yesterday's Divided Wall Column report indicates that it ran near capacity with a production of 100K barrels. There were 2 Critical alarms. There were no known environmental excursions." The audio version may be presented in a natural language format. For example, the edge-facing component 12 may communicate with the grammar module or plant vocabulary database described above to generate the audio version in the natural language format.

The vehicle head unit 900 may also present a graphical version of the divided wall column report (not shown) on the display 902. The graphical version of the divided wall column report may include a graphical representation of the divided wall column as well as the inputs and outputs to the divided wall column. The graphical version may also include process parameter data for the divided wall column and/or product parameter data for the products input and output into/from the divided wall column. Furthermore, the graphical version of the divided wall column report may include text transcribed from the audio version.

In some implementations, the process plant application or the edge-facing component 12 may generate multiple versions of the reports, such as a condensed version and a complete version for each report. The condensed version may include a summary of the information included in the complete version. The process plant application may communicate with sensors in the vehicle head unit 900 to determine the speed of the vehicle. If the vehicle is traveling at a speed above a threshold speed (e.g., 10 mph), the process plant application may present the condensed version of the report in an audio format via the speaker and/or the display 902 to reduce driver distraction. On the other hand, if the vehicle is traveling at or below the threshold speed (e.g., 10 mph), the process plant application may present the complete version of the report via the speaker and/or the display 902. Additionally, the process plant application may present condensed versions of process flow modules, control modules, faceplates, process plant entities, etc., in response to determining that the vehicle is travelling above a threshold speed. More specifically, a condensed version of a process flow module may not include some of the process parameter data, process plant entities, alarms, etc., included in the complete version of the process flow module.

An example process plant display 1100 presented on the vehicle head unit 900 and including a process flow module 1102 is illustrated in FIG. 11. The process flow module 1102 may be the complete version, while a condensed version may not include some of the process parameter data, process plant entities, alarms, warnings, etc., included in the complete version. The process flow module 1102 may include real-time process plant-related data from the on-line process plant 5, such as real-time process parameter data. While the user cannot remotely adjust set point values for example, because the process plant application on the vehicle head unit 900 is not communicatively coupled to the process plant 5, the user can view set points, process parameter values, events, etc., within the on-line process plant 5. In some implementations, the process plant display 1100 is presented in response to a request by the user to view the process flow module 1102. In other implementations, the process plant display 1100 is a default display which presents a process flow module having process plant-related data which corresponds to the user's organizational role or which the user requested to view previously.

In addition to presenting process plant-related data in response to requests by the user or as default data, the process plant application executing on the vehicle head unit 900 may obtain and present notifications when an event occurs at the process plant 5 which may be of interest to the user according to the user's organizational role. For example, the edge-facing component 12 may identify control modules, process flow modules, process plant entities, etc., that the user operates, maintains, is responsible for, etc., according to the user's organizational role. In some implementations, the user may input a set of control modules, process flow modules, process plant entities, etc., to remotely monitor via user controls at the process plant application. When an event is stored in the contextual knowledge repository 42 which is related to one of the identified control modules, process flow modules, process plant entities, etc., for the user, the edge-facing component 12 may transmit a notification to the process plant application to be presented by the vehicle head unit 900. The notification may include a description of the event and a subset of the process plant-related data from the contextual knowledge database 42 which corresponds to the event. The notification may also include a link to a detailed description of the event along with a graphical display of the process flow module, control module, process plant entity, etc., associated with the event, process parameter data for the event, alarms and/or warnings associated with the event, etc.

Figure 12:
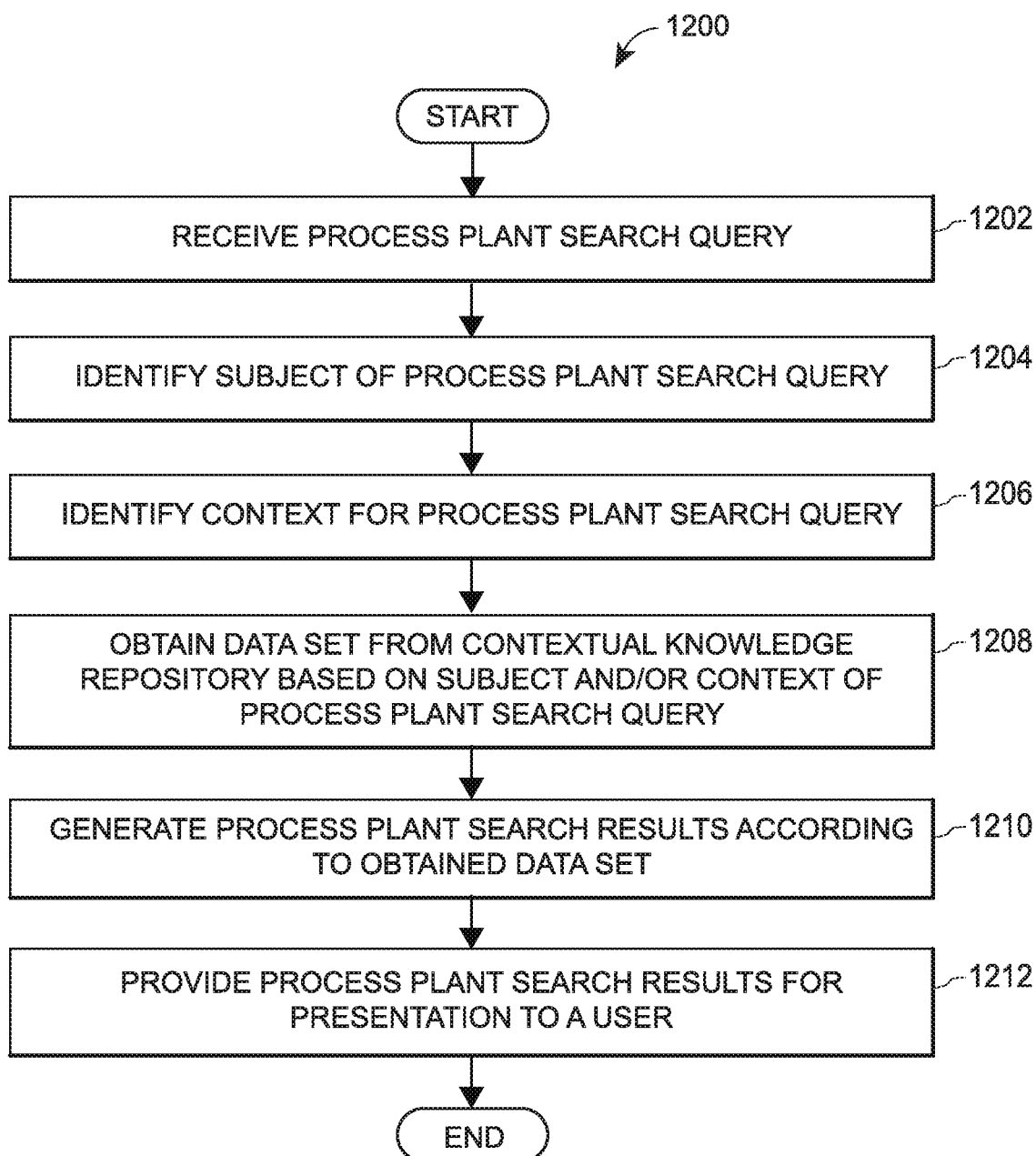
FIG. 12 is a flow diagram representing an exemplary method for providing process plant search results in response to a process plant search query.

FIG. 12 illustrates a flow diagram representing an exemplary method 1200 for providing search results in response to a process plant search query. The method 1200 may be executed by the process plant search query server 400 as shown in FIG. 12, the edge-facing component 12 as shown in FIG. 1, or any suitable computing device within the process plant 5 or external to the process plant 5 and communicating with the edge-facing component 12.

At block 1202, the process plant search query server 400 receives a process plant search query from a user interface device. The process plant search query may be any search query related to a process plant-related data and/or related to process plant entities within the process plant. The process plant search query may be a voice-based or text-based process plant search query. When the process plant search query is a voice-based process plant search query, the user interface device may transcribe the voice-based process plant search query to text and transmit the text to the process plant search query server 400. In other implementations, the user interface device may transmit the voice-based process plant search query to the process plant search query server 400, and the process plant search query server 400 may transcribe the voice-based process plant search query to text.

The process plant search query server 400 then analyzes/parses the process plant search query to identify the subject of the search query (block 1204), context for the search query (block 1206), and/or other information in the search query which may be used to filter a data set responsive to the search query. More specifically, the process plant search query server 400 may obtain indications of subjects and filters from a grammar module or plant vocabulary database included in the process plant search query server 400 or communicatively coupled to the process plant search query server 400. The grammar module or plant vocabulary database may store several subjects of process plant search queries and filters which modify the subjects to filter the search results. The grammar module or plant vocabulary database may also store several mappings of terms from process plant search queries which correspond to each subject and/or filter, such as synonyms or nicknames for the subject or filter.

The process plant search query server 400 may also identify context for the process plant search query from a user profile for the user included in a user database, for example. The user may provide login information which may be used by the process plant search query server 400 to access the user information. Additionally, the context may include device information for the device in which the user submits the process plant search query, such as the location of the device which may include a location within a process plant or may be an external location, the capabilities of the device (e.g., audio, display, microphone, applications executing on the device, etc.), the type of the device, the size of the device, etc. Moreover, the context may include the time in which the process plant search query is submitted.

At block 1208, the process plant search query server 400 obtains a data set of process plant-related data from the contextual knowledge repository 42 responsive to the search query which corresponds to the subject of the process plant search query. The process plant search query server 400 may then filter the data set according to the filters in the process plant search query and/or context associated with the process plant search query. For example, the subject of the process plant search query may be alarms. Accordingly, the process plant search query server 400 may retrieve a data set of process plant-related data from the contextual knowledge repository 42 related to alarms. The filters for the process plant search query may be critical alarms, alarms for a particular boiler unit, and alarms that occurred in the previous eight hours. The process plant search query server 400 may then filter the data set to remove process plant-related data which is not related to critical alarms, alarms for the particular boiler unit, and alarms that occurred in the previous eight hours.

At block 1210, the process plant search query server 400 may then generate a set of process plant search results according to the filtered data set. The process plant search query server 400 may transform the filtered data set into process plant search results by generating a natural language response for each data item in the filtered data set. For example, the process plant search query server 400 may transform a data item into a process plant search result by obtaining an introductory statement, such as "Good morning," "Good afternoon," "Happy Holiday!" etc., from the grammar module or plant vocabulary based on the time of day/year and/or the user's name. The process plant search query server 400 may also obtain a natural language response to the process plant search query from the grammar module or plant vocabulary, such as "Critical alarms include . . . " or "You have critical alarms . . . " The natural language response may be a predetermined natural language response which is stored in the grammar module or plant vocabulary database in association with a particular process plant query subject or with a particular process plant query subject and one or more filters. For example, each time the process plant query subject is alarms, the predetermined natural language response may be "You have_alarms . . . " When one of the filters is critical alarms, the predetermined natural language response may be modified to "You have_critical alarms . . . " In other implementations, the process plant search query server 400 may generate a search result as a link to the data item in the filtered data set, such as a link to detailed information regarding a control module, as shown in FIG. 6.

Then at block 1212, the process plant search query server 400 provides the set of process plant search results to the user interface device for display. The set of process plant search results may be provided in a text format and presented graphically on a user interface of the user interface device or may be provided in an audio format and presented via a speaker.

Figure 13:
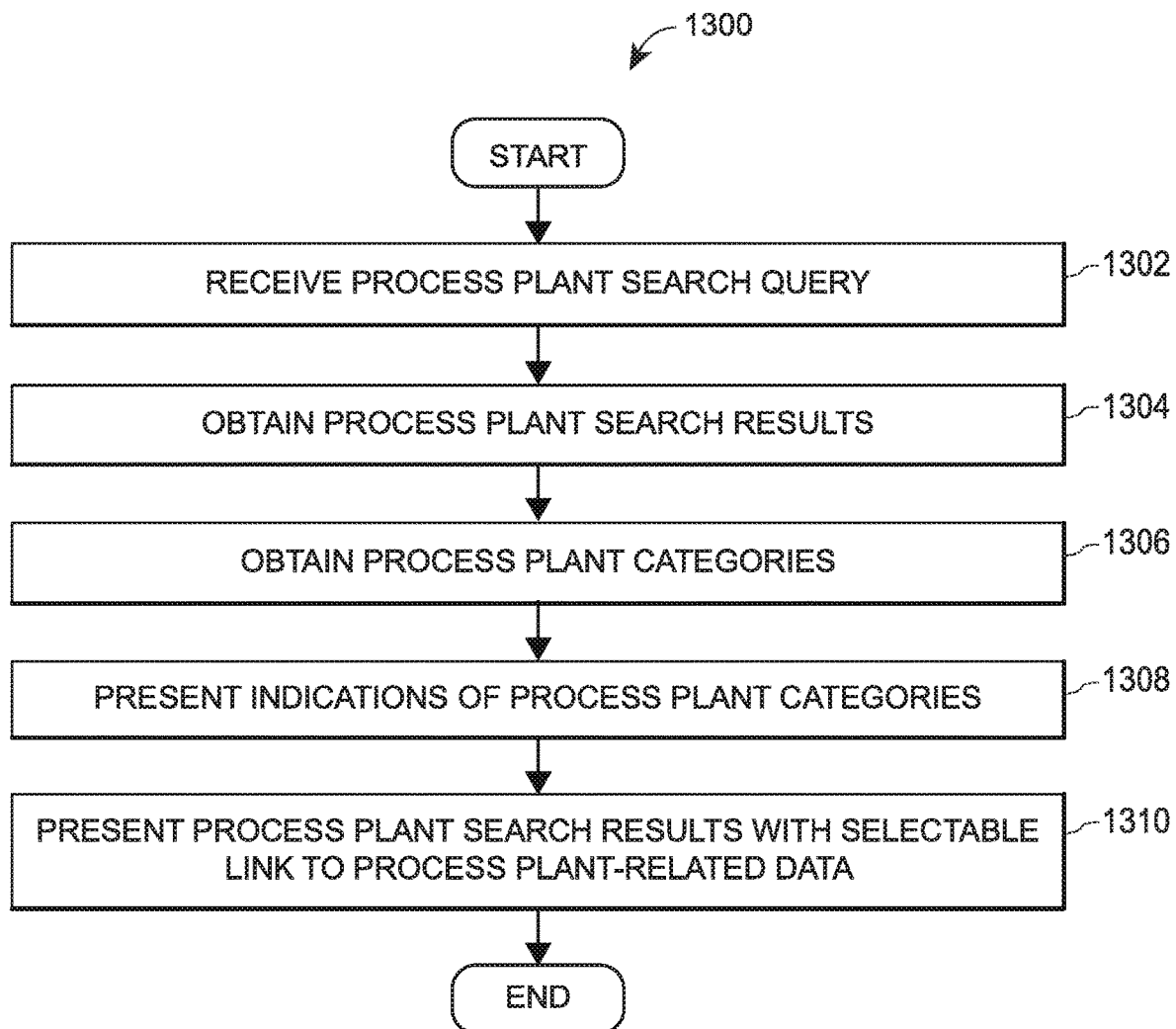
FIG. 13 is a flow diagram representing an exemplary method for presenting process plant search results in response to a process plant search query.

FIG. 13 illustrates a flow diagram representing an exemplary method 1300 for presenting process plant search results in response to a process plant search query. The method 1300 may be executed by an external system 8 as shown in FIG. 1, such as a user interface device or may be executed by a user interface device operating within the process plant 5.

At block 1302, the user interface device receives a process plant search query from a user. The process plant search query may be any search query related to a process plant-related data and/or related to process plant entities within the process plant. Moreover, the process plant search query may be provided via text input by selecting a user control on the user interface device, such as a process plant search bar or via audio input. The user interface device may then provide the process plant search query to the process plant search query server 400. Additionally, the user interface device may provide user information, device information, a search history of previous search queries for the user, indications of graphical information presented on the process plant-related data when the process plant search query is submitted, etc. as context for the process plant search query. The process plant search query server 400 then analyzes the process plant search query and the context and generates a set of process plant search results responsive to the process plant search query.

At block 1304, the user interface device obtains a set of process plant search results for example, from the process plant search query server 400. In some implementations, the process plant search query server 400 also generates a set of process plant categories corresponding to the process plant search results, such as all, alarms, control modules, process flow modules, reports, etc. The user interface device obtains the set of process plant categories (block 1306) and presents indications of the process plant categories (block 1308) and a subset of the process plant search results that correspond to each process plant category (block 1310) in a process plant search results display. Each process plant search result may include a selectable link to detailed information regarding the process plant search result. The detailed information regarding the process plant search result may include process plant-related data, such as configuration data, run-time data, maintenance data, analysis data, environmental data, diagnostic data, etc. Additionally, each process plant search result may include a thumbnail image or preview of the detailed information regarding the process plant search result. For example, for a process plant search result including a control module, the thumbnail image or preview corresponding to the process plant search result may be a thumbnail image of a graphical representation of the control module.

Figure 14:
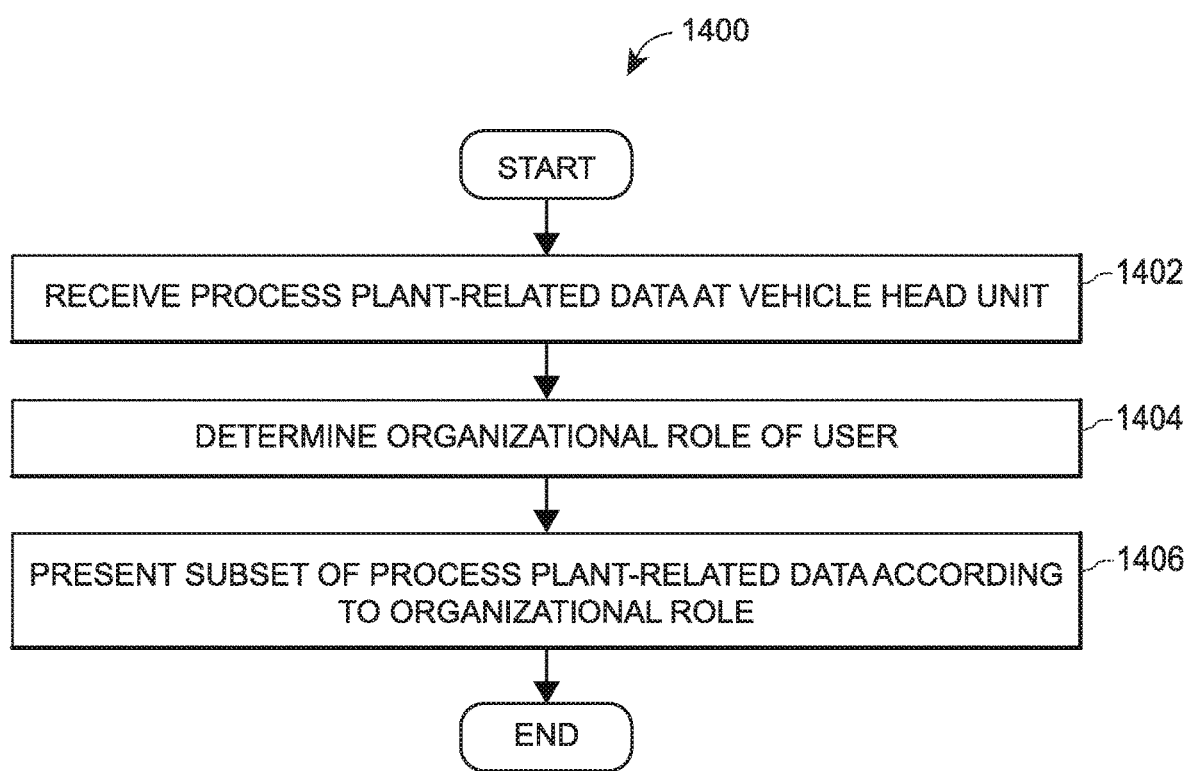
FIG. 14 is a flow diagram representing an exemplary method for presenting process plant-related data within a vehicle head unit.

FIG. 14 illustrates a flow diagram representing an exemplary method 1400 for presenting process plant-related data within a vehicle head unit. The method 1400 may be executed by the vehicle head unit 900 as shown in FIG. 9.

At block 1402, process plant-related data is received at a process plant application executing on the vehicle head unit 900. The process plant-related data may be received in response to a request by a user, may be default process plant-related data, or may be received as a notification in response to an event at the process plant 5 which may be related to the user's organizational role. At block 1404, the user's organizational role may be determined and the process plant application may present a subset of the process plant-related data on the vehicle head unit 900 according to the user's organizational role (block 1406).

In some implementations, the edge-facing component 12 may generate and provide the subset of the process plant-related data to the process plant application based on the user's organizational role. The process planted-related data presented by the vehicle head unit 900 may include reports generated for the user within a particular time period, updates on process plant entities that the user operates, maintains, is responsible for, etc., alarms or critical information for these process plant entities, a graphical representation of a process flow module or control module that the user most recently viewed, or a process flow module or control module that includes process plant entities that the user operates, maintains, is responsible for, etc.

The process plant-related data may be presented graphically on a user interface of the vehicle head unit 900 or audibly via a speaker. Additionally, the process plant-related data may be presented in a natural language format.

Embodiments of the techniques described in the present disclosure may include any number of the following aspects, either alone or combination:

1. A method for providing search results in response to a process plant search query, the method comprising: receiving, at a computing device, a process plant search query from a user related to one or more process plant entities within a process plant; obtaining, by the computing device, a data set responsive to the process plant search query from a knowledge repository in which process plant-related data that describes attributes of the process plant entities is organized according to semantic relations between the process plant-related data and the process plant entities; and providing, by the computing device, a set of search results to the user based on the obtained data set responsive to the process plant search query.

2. The method of aspect 1, further comprising: analyzing one or more terms within the process plant search query to identify a subject of the process plant search query; obtaining the data set from the knowledge repository including process plant-related data corresponding to the subject of the process plant query; analyzing one or more remaining terms within the process plant search query to identify one or more filters for filtering the data set; filtering the data set according to the one or more filters; and providing the set of search results to the user according to the filtered data set.

3. The method of any one of the previous aspects, further comprising: identifying context for the process plant search query; identifying one or more additional filters for filtering the data set according to the context; and filtering the data set according to the one or more additional filters.

4. The method of any one of the previous aspects, wherein the context includes an organizational role of the user, a location of the user, a time of the process plant search query, or previous process plant search queries from the user.

5. The method of any one of the previous aspects, further comprising: ranking the set of search results based on (i) context for the process plant search query or (ii) an amount in which each search result corresponds to the one or more remaining terms within the process plant search query; and providing the ranked set of search results to the user.

6. The method of any one of the previous aspects, wherein analyzing one or more terms within the process plant search query to identify a subject of the process plant search query includes: obtaining a plurality of candidate process plant search query subjects; analyzing the process plant search query to identify a likelihood that each of the plurality of candidate process plant search query subjects corresponds to the process plant search query; and identifying the subject as the candidate process plant search query subject of the plurality of candidate process plant search query subjects having a highest likelihood of corresponding to the process plant search query.

7. The method of any one of the previous aspects, further comprising: identifying the one or more terms within the process plant search query associated with the identified subject; and analyzing the one or more remaining terms within the process plant search query to identify one or more filters for filtering the data set.

8. The method of any one of the previous aspects, wherein process plant-related data that describes attributes of the process plant entities includes at least one of: configuration data, run-time data, environmental data, maintenance data, analysis data, or diagnostic data.

9. The method of any one of the previous aspects, wherein receiving a process plant search query includes receiving a voice-based process plant search query or receiving a text-based process plant search query.

10. The method of any one of the previous aspects, wherein providing a set of search results to the user includes providing the set of search results in an audio format or a text format for presentation at a user interface device.

11. The method of any one of the previous aspects, wherein the knowledge repository includes duplicates of the process plant-related data generated within the process plant and the computing device does not directly interact with the process plant-related data generated within the process plant.

12. A computing device for providing search results in response to a process plant search query comprising: one or more processors; a communication unit; and one or more non-transitory computer-readable media coupled to the one or more processors and to the communication unit, the one or more non-transitory computer-readable media storing instructions thereon that, when executed by the one or more processors, cause the computing device to: receive a process plant search query from a user related to one or more process plant entities within a process plant; obtain a data set responsive to the process plant search query from a knowledge repository in which process plant-related data that describes attributes of the process plant entities is organized according to semantic relations between the process plant-related data and the process plant entities; and provide, via the communication unit, a set of search results to the user based on the obtained data set responsive to the process plant search query.

13. The computing device of the previous aspect, wherein the instructions further cause the computing device to: analyze one or more terms within the process plant search query to identify a subject of the process plant search query; obtain the data set from the knowledge repository including process plant-related data corresponding to the subject of the process plant query; analyze one or more remaining terms within the process plant search query to identify one or more filters for filtering the data set; filter the data set according to the one or more filters; and provide the set of search results to the user according to the filtered data set.

14. The computing device of any one of aspects 12-13, wherein the instructions further cause the computing device to: identify context for the process plant search query; identify one or more additional filters for filtering the data set according to the context; and filter the data set according to the one or more additional filters.

15. The computing device of any one of aspects 12-14, wherein the context includes an organizational role of the user, a location of the user, a time of the process plant search query, or previous process plant search queries from the user.

16. The computing device of any one of aspects 12-15, wherein the instructions further cause the computing device to: rank the set of search results based on (i) context for the process plant search query or (ii) an amount in which each search result corresponds to the one or more remaining terms within the process plant search query; and provide the ranked set of search results to the user.

17. The computing device of any one of aspects 12-16, wherein to analyze one or more terms within the process plant search query to identify a subject of the process plant search query, the instructions cause the computing device to: obtain a plurality of candidate process plant search query subjects; analyze the process plant search query to identify a likelihood that each of the plurality of candidate process plant search query subjects corresponds to the process plant search query; and identify the subject as the candidate process plant search query subject of the plurality of candidate process plant search query subjects having a highest likelihood of corresponding to the process plant search query.

18. The computing device of any one of aspects 12-17, wherein the instructions further cause the computing device to: identify the one or more terms within the process plant search query associated with the identified subject; and analyze the one or more remaining terms within the process plant search query to identify one or more filters for filtering the data set.

19. The computing device of any one of aspects 12-18, wherein process plant-related data that describes attributes of the process plant entities includes at least one of: configuration data, run-time data, environmental data, maintenance data, analysis data, or diagnostic data.

20. The computing device of any one of aspects 12-19, wherein the process plant search query includes a voice-based process plant search query or a text-based process plant search query.

21. The computing device of any one of aspects 12-20, wherein the set of search results are provided in an audio format or a text format for presentation at a user interface device.

22. The computing device of any one of aspects 12-21, wherein the knowledge repository includes duplicates of the process plant-related data generated within the process plant and the computing device does not directly interact with the process plant-related data generated within the process plant.

23. A process control system comprising: one or more devices corresponding to a process plant entity disposed in the process plant and performing a physical function to control an industrial process; a data diode communicatively connecting the one or more devices to a computing device, the data diode configured to prevent two-way communications between a network of the process plant and the computing device; and the computing device comprising: one or more processors; a communication unit; and one or more non-transitory computer-readable media coupled to the one or more processors and to the communication unit, the one or more non-transitory computer-readable media storing instructions thereon that, when executed by the one or more processors, cause the computing device to: receive, via the data diode and the communication unit, a duplicate of process plant-related data generated by the one or more devices of the process plant while the process plant is on-line, the process plant-related data secured for transmission from the one or more devices to the computing device via the data diode; store the duplicate of the process plant-related data in a knowledge repository in which the process plant-related data that describes attributes of the process plant entities is organized according to semantic relations between the process plant-related data and the process plant entities; and provide at least some of the data from the knowledge repository to an application or other computing device.

24. The process control system of the previous aspect, wherein the instructions further cause the computing device to: provide a subset of the duplicate of the process plant-related data as search results in response to a process plant search query.

25. A method for presenting process plant search results in response to a process plant search query, the method comprising: receiving, at a user interface device, a process plant search query from a user related to one or more process plant entities within a process plant; obtaining, by the user interface device, a set of process plant search results in response to the process plant search query; and presenting, by the user interface device, the set of process plant search results within a process plant search results display, wherein each process plant search result includes a selectable link to process plant-related data within the process plant.

26. The method of the previous aspect, wherein presenting the set of process plant search results within a process plant search results display includes presenting each process plant search result with a thumbnail image including a preview of the process plant-related data presented in the selectable link.

27. The method of any one of aspects 25-26, further comprising: obtaining, by the user interface device, a plurality of process plant categories corresponding to the set of process plant search results; for each of the plurality of process plant categories, obtaining, by the user interface device, a subset of the process plant search results corresponding to the respective process plant category; presenting, by the user interface device, indications of each of the plurality of process plant categories within the process plant search results display; and for each of the plurality of process plant categories, presenting, by the user interface device, the subset of the process plant search results with the indication of the respective process plant category.

28. The method of any one of aspects 25-27, wherein presenting the subset of the process plant search results with the indication of the respective process plant category includes: in response to receiving a selection of one of the indications of the plurality of s process plant categories, presenting the subset of the process plant search results corresponding to the selected process plant category.

30. The method of any one of aspects 25-29, wherein obtaining a set of process plant search results in response to the process plant search query includes: obtaining a ranked set of process plant search results, each process plant search result having a respective ranking; and presenting the set of process plant search results in a ranked order according to the respective rankings.

31. The method of any one of aspects 25-30, further comprising: determining a size or type of the user interface device; and adjusting the presentation of the set of process plant search results within the process plant search results display based on the size or type of the user interface device.

32. The method of any one of aspects 25-31, further comprising: in response to determining that the user interface device is a mobile device, presenting a single process plant search result within the process plant search results display.

33. The method of any one of aspects 25-32, further comprising: in response to determining that the size of the user interface device is above a threshold size, presenting the set of process plant search results within the process plant search results display.

34. The method of any one of aspects 25-33, wherein obtaining a set of process plant search results in response to the process plant search query includes: transmitting the process plant search query to a server computing device; and receiving the set of process plant search results from the server computing device.

35. The method of any one of aspects 25-34, wherein presenting the set of process plant search results, wherein each process plant search result includes a selectable link to process plant-related data includes presenting each process plant search result having a selectable link to at least one of: configuration data, run-time data, environmental data, maintenance data, analysis data, or diagnostic data.

36. The method of any one of aspects 25-35, wherein the selectable link to process plant-related data within the process plant is a selectable link to a duplicate of the process plant-related data within the process plant such that user interactions with the duplicate of the process plant-related data do not effect run-time operation of the process plant.

37. A user interface device for presenting process plant search results in response to a process plant search query, the user interface device comprising: one or more processors; a user interface; and one or more non-transitory computer-readable media coupled to the one or more processors and to the user interface, the one or more non-transitory computer-readable media storing instructions thereon that, when executed by the one or more processors, cause the user interface device to: receive a process plant search query from a user related to one or more process plant entities within a process plant; obtain a set of process plant search results in response to the process plant search query; and present the set of process plant search results within a process plant search results display, wherein each process plant search result includes a selectable link to process plant-related data within the process plant.

38. The user interface device of the previous aspect, wherein each process plant search result is presented with a thumbnail image including a preview of the process plant-related data presented in the selectable link.

39. The user interface device of any one of aspects 37-38, wherein the instructions further cause the user interface device to: obtain a plurality of process plant categories corresponding to the set of process plant search results; for each of the plurality of process plant categories, obtain a subset of the process plant search results corresponding to the respective process plant category; present, via the user interface, indications of each of the plurality of process plant categories within the process plant search results display; and for each of the plurality of process plant categories, present, via the user interface, the subset of the process plant search results with the indication of the respective process plant category.

40. The user interface device of any one of aspects 37-39, wherein to present the subset of the process plant search results with the indication of the respective process plant category, the instructions cause the user interface device to: in response to receiving a selection of one of the indications of the plurality of s process plant categories, present, via the user interface, the subset of the process plant search results corresponding to the selected process plant category.

41. The user interface device of any one of aspects 37-40, wherein to obtain a set of process plant search results in response to the process plant search query, the instructions cause the user interface device to: obtain a ranked set of process plant search results, each process plant search result having a respective ranking; and present, via the user interface, the set of process plant search results in a ranked order according to the respective rankings.

42. The user interface device of any one of aspects 37-41, wherein the instructions further cause the user interface device to: determine a size or type of the user interface device; and adjust the presentation of the set of process plant search results within the process plant search results display based on the size or type of the user interface device.

43. The user interface device of any one of aspects 37-42, wherein the instructions further cause the user interface device to: in response to determining that the user interface device is a mobile device, present, via the user interface, a single process plant search result within the process plant search results display.

44. The user interface device of any one of aspects 37-43, further comprising a speaker, wherein the instructions further cause the user interface device to: present, via the speaker, a summary of the process plant-related data associated with the single process plant search result in an audio format.

45. The user interface device of any one of aspects 37-44, wherein the instructions further cause the user interface device to: in response to determining that the size of the user interface device is above a threshold size, present, via the user interface, the set of process plant search results within the process plant search results display.

46. The user interface device of any one of aspects 37-45, wherein to obtain a set of process plant search results in response to the process plant search query, the instructions cause the user interface device to: transmit the process plant search query to a server computing device; and receive the set of process plant search results from the server computing device.

47. The user interface device of any one of aspects 37-46, wherein the process plant-related data includes at least one of: configuration data, run-time data, environmental data, maintenance data, analysis data, or diagnostic data.

48. The user interface device of any one of aspects 37-47, wherein the selectable link to process plant-related data within the process plant is a selectable link to a duplicate of the process plant-related data within the process plant such that user interactions with the duplicate of the process plant-related data do not effect run-time operation of the process plant.

49. A non-transitory computer-readable medium storing instructions thereon that, when executed by the one or more processors, cause the one or more processors to: receive a process plant search query from a user related to one or more process plant entities within a process plant; obtain a set of process plant search results in response to the process plant search query; and present the set of process plant search results within a process plant search results display of a user interface device, wherein each process plant search result includes a selectable link to process plant-related data within the process plant.

50. The non-transitory computer-readable medium of the previous aspect, wherein each process plant search result is presented with a thumbnail image including a preview of the process plant-related data presented in the selectable link.

51. The non-transitory computer-readable medium of any one of aspects 49-50, wherein the instructions further cause the one or more processors to: obtain a plurality of process plant categories corresponding to the set of process plant search results; for each of the plurality of process plant categories, obtain a subset of the process plant search results corresponding to the respective process plant category; present, via the user interface, indications of each of the plurality of process plant categories within the process plant search results display; and for each of the plurality of process plant categories, present, via the user interface, the subset of the process plant search results with the indication of the respective process plant category.

52. The non-transitory computer-readable medium of any one of aspects 49-51, wherein the instructions further cause the one or more processors to: determine a size or type of the user interface device; and adjust the presentation of the set of process plant search results within the process plant search results display based on the size or type of the user interface device 53. A method for presenting process plant-related data within a vehicle head unit, the method comprising: receiving, at a process plant application executing in a vehicle head unit, process plant-related data related to one or more process plant entities within a process plant, the one or more process plant entities performing a physical function to control an industrial process; and presenting, by the vehicle head unit, the process plant-related data for a user to remotely monitor online operation of the process plant, wherein the process plant-related data is a duplicate of process plant-related data generated within the process plant, such that the vehicle head unit does not directly interact with the process plant-related data generated within the process plant.

54. The method of the previous aspect, further comprising: determining an organizational role of the user within the process plant, wherein presenting the process plant-related data for a user to remotely monitor online operation of the process plant includes presenting a subset of the process plant-related data which is related to the organizational role of the user.

55. The method of any one of aspects 53-54, further comprising: in response to an event occurring within the online operation of the process plant and related to the organizational role of the user, presenting a notification regarding at least some of the process plant-related data associated with the event.

56. The method of any one of aspects 53-55, wherein presenting the process plant-related data for a user to remotely monitor online operation of the process plant includes presenting a report regarding at least one of the one or more process plant entities related to the organizational role of the user, the report including at least some of the process plant-related data related to the at least one process plant entity.

57. The method of any one of aspects 53-56, further comprising: determining a speed of the vehicle; comparing the speed of the vehicle to a threshold speed; and in response to determining that the speed of the vehicle exceeds the threshold speed, presenting a condensed version of the report regarding the at least one process plant entity related to the organizational role of the user in an audio format.

58. The method of any one of aspects 53-57, wherein presenting the process plant-related data for a user to remotely monitor online operation of the process plant includes presenting a graphical representation of a process flow module depicting run-time operation of at least one of the one or more process plant entities including process parameter data for the at least one process plant entity.

59. The method of any one of aspects 53-58, further comprising: presenting the process plant-related data on a user interface of the vehicle head unit.

60. The method of any one of aspects 53-59, further comprising: presenting the process plant-related data via a speaker of the vehicle head unit.

61. The method of any one of aspects 53-60, further comprising: presenting the process plant-related data in a natural language format.

62. The method of any one of aspects 53-61, further comprising: receiving a process plant search query from the user related to the one or more process plant entities; and presenting, by the vehicle head unit, a set of process plant search results responsive to the process plant search query, the set of process plant search results including at least some of the process plant-related data.

63. A vehicle head unit comprising: one or more processors; a user interface; a speaker; and one or more non-transitory computer-readable media coupled to the one or more processors, the one or more non-transitory computer-readable media storing a process plant application thereon that, when executed by the one or more processors, cause the vehicle head unit to: receive process plant-related data related to one or more process plant entities within a process plant, the one or more process plant entities performing a physical function to control an industrial process; and present, via the user interface or the speaker, the process plant-related data for a user to remotely monitor online operation of the process plant, wherein the process plant-related data is a duplicate of process plant-related data generated within the process plant, such that the vehicle head unit does not directly interact with the process plant-related data generated within the process plant.

64. The vehicle head unit of the previous aspect, wherein the process plant application further causes the vehicle head unit to: determine an organizational role of the user within the process plant; and present a subset of the process plant-related data which is related to the organizational role of the user.

65. The vehicle head unit of any one of aspects 63-64, wherein the process plant application further causes the vehicle head unit to: in response to an event occurring within the online operation of the process plant and related to the organizational role of the user, present a notification regarding at least some of the process plant-related data associated with the event.

66. The vehicle head unit of any one of aspects 63-65, wherein to present the process plant-related data for a user to remotely monitor online operation of the process plant, the process plant application causes the vehicle head unit to present a report regarding at least one of the one or more process plant entities related to the organizational role of the user, the report including at least some of the process plant-related data related to the at least one process plant entity.

67. The vehicle head unit of any one of aspects 63-66, wherein the process plant application further causes the vehicle head unit to: determine a speed of the vehicle; compare the speed of the vehicle to a threshold speed; and in response to determining that the speed of the vehicle exceeds the threshold speed, present a condensed version of the report regarding the at least one process plant entity related to the organizational role of the user in an audio format.

68. The vehicle head unit of any one of aspects 63-67, wherein to present the process plant-related data for a user to remotely monitor online operation of the process plant, the process plant application causes the vehicle head unit to present a graphical representation of a process flow module depicting run-time operation of at least one of the one or more process plant entities including process parameter data for the at least one process plant entity.

69. The vehicle head unit of any one of aspects 63-68, wherein the process plant application further causes the vehicle head unit to: present the process plant-related data in a natural language format.

70. The vehicle head unit of any one of aspects 63-69, wherein the process plant application further causes the vehicle head unit to: receive a process plant search query from the user related to the one or more process plant entities; and present a set of process plant search results responsive to the process plant search query, the set of process plant search results including at least some of the process plant-related data.

71. A non-transitory computer-readable medium storing instructions thereon that, when executed by the one or more processors in a vehicle head unit, cause the vehicle head unit to: receive process plant-related data related to one or more process plant entities within a process plant, the one or more process plant entities performing a physical function to control an industrial process; and present, via a user interface or a speaker of the vehicle head unit, the process plant-related data for a user to remotely monitor online operation of the process plant, wherein the process plant-related data is a duplicate of process plant-related data generated within the process plant, such that the vehicle head unit does not directly interact with the process plant-related data generated within the process plant.

72. The non-transitory computer-readable medium of the previous aspect, wherein the process plant application further causes the vehicle head unit to: determine an organizational role of the user within the process plant; and present a subset of the process plant-related data which is related to the organizational role of the user.

73. The non-transitory computer-readable medium of any one of aspects 71-72, wherein the process plant application further causes the vehicle head unit to: in response to an event occurring within the online operation of the process plant and related to the organizational role of the user, present a notification regarding at least some of the process plant-related data associated with the event.

74. The non-transitory computer-readable medium of any one of aspects 71-73, wherein to present the process plant-related data for a user to remotely monitor online operation of the process plant, the process plant application causes the vehicle head unit to present a report regarding at least one of the one or more process plant entities related to the organizational role of the user, the report including at least some of the process plant-related data related to the at least one process plant entity.

75. The non-transitory computer-readable medium of any one of aspects 71-74, wherein the process plant application further causes the vehicle head unit to: determine a speed of the vehicle; compare the speed of the vehicle to a threshold speed; and in response to determining that the speed of the vehicle exceeds the threshold speed, present a condensed version of the report regarding the at least one process plant entity related to the organizational role of the user in an audio format.

76. The non-transitory computer-readable medium of any one of aspects 71-75, wherein to present the process plant-related data for a user to remotely monitor online operation of the process plant, the process plant application causes the vehicle head unit to present a graphical representation of a process flow module depicting run-time operation of at least one of the one or more process plant entities including process parameter data for the at least one process plant entity.

77. The non-transitory computer-readable medium of any one of aspects 71-76, wherein the process plant application further causes the vehicle head unit to: present the process plant-related data in a natural language format.

78. The non-transitory computer-readable medium of any one of aspects 71-77, wherein the process plant application further causes the vehicle head unit to: receive a process plant search query from the user related to the one or more process plant entities; and present a set of process plant search results responsive to the process plant search query, the set of process plant search results including at least some of the process plant-related data.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method for presenting process plant search results in response to a process plant search query, the method comprising:
    receiving, at a remote user interface device which does not have authorized access to directly communicate with a process plant, a process plant search query in a natural language format from a user related to one or more process plant entities within the process plant;
    obtaining, by the remote user interface device, a set of process plant search results in response to the process plant search query from a knowledge repository at an edge-computing device generated by: (i) creating a duplicate of process plant-related data included in a field-facing component of the process plant, wherein the field-facing component interacts directly with data generated within the process plant and (ii) organizing the duplicate process plant-related data that describes attributes of the process plant entities according to semantic relations between the process plant-related data and the process plant entities, wherein the remote user interface device does not directly interact with the process plant-related data generated within the process plant, and wherein the duplicate process plant-related data includes run-time data; and
    presenting, by the remote user interface device, the set of process plant search results within a process plant search results display, wherein each process plant search result includes a selectable link to the duplicate process plant-related data, such that user interactions with the duplicate of the process plant-related data do not effect run-time operation of the process plant, thereby allowing the remote user interface device to perform a search regarding data in the process plant of the duplicate process plant-related data so that the remote user interface device does not directly interact with the process plant-related data in the field-facing component, and allowing the remote user interface device which does not have authorized access to directly communicate with the process plant to receive the duplicate process plant-related data representing activity in the process plant in a highly secure manner without impacting performance of the process plant.

2. The method of claim 1, wherein presenting the set of process plant search results within a process plant search results display includes presenting each process plant search result with a thumbnail image including a preview of the duplicate process plant-related data presented in the selectable link.

3. The method of claim 1, further comprising:
    obtaining, by the remote user interface device, a plurality of process plant categories corresponding to the set of process plant search results;
    for each of the plurality of process plant categories, obtaining, by the remote user interface device, a subset of the process plant search results corresponding to the respective process plant category;
    presenting, by the remote user interface device, indications of each of the plurality of process plant categories within the process plant search results display; and
    for each of the plurality of process plant categories, presenting, by the remote user interface device, the subset of the process plant search results with the indication of the respective process plant category.

4. The method of claim 3, wherein presenting the subset of the process plant search results with the indication of the respective process plant category includes:
    in response to receiving a selection of one of the indications of the plurality of process plant categories, presenting the subset of the process plant search results corresponding to the selected process plant category.

5. The method of claim 1, wherein obtaining a set of process plant search results in response to the process plant search query includes:
    obtaining a ranked set of process plant search results, each process plant search result having a respective ranking; and
    presenting the set of process plant search results in a ranked order according to the respective rankings.

6. The method of claim 1, further comprising:
    determining a size or type of the remote user interface device; and
    adjusting the presentation of the set of process plant search results within the process plant search results display based on the size or type of the remote user interface device.

7. The method of claim 6, further comprising:
    in response to determining that the remote user interface device is a mobile device, presenting a single process plant search result within the process plant search results display.

8. The method of claim 6, further comprising:
    in response to determining that the size of the remote user interface device is above a threshold size, presenting the set of process plant search results within the process plant search results display.

9. The method of claim 1, wherein obtaining a set of process plant search results in response to the process plant search query includes:
    transmitting the process plant search query to the edge computing device; and
    receiving the set of process plant search results from the edge computing device.

10. A remote user interface device for presenting process plant search results in response to a process plant search query, the remote user interface device comprising:
    one or more processors;
    a user interface; and
    one or more non-transitory computer-readable media coupled to the one or more processors and to the user interface, the one or more non-transitory computer-readable media storing instructions thereon that, when executed by the one or more processors, cause the remote user interface device to:

receive a process plant search query in a natural language format from a user related to one or more process plant entities within a process plant;

obtain a set of process plant search results in response to the process plant search query from a knowledge repository at an edge-computing device generated by: (i) creating a duplicate of process plant-related data included in a field-facing component of the process plant, wherein the field-facing component interacts directly with data generated within the process plant and (ii) organizing the duplicate process plant-related data that describes attributes of the process plant entities according to semantic relations between the process plant-related data and the process plant entities, wherein the remote user interface device does not have authorized access to directly communicate with the process plant and does not directly interact with the process plant-related data generated within the process plant, and wherein the duplicate process plant-related data includes run-time data; and present the set of process plant search results within a process plant search results display, wherein each process plant search result includes a selectable link to the duplicate process plant-related data, such that user interactions with the duplicate of the process plant-related data do not effect run-time operation of the process plant, thereby allowing the remote user interface device to perform a search regarding data in the process plant of the duplicate process plant-related data so that the remote user interface device does not directly interact with the process plant-related data in the field-facing component, and allowing the remote user interface device which does not have authorized access to directly communicate with the process plant to receive the duplicate process plant-related data representing activity in the process plant in a highly secure manner without impacting performance of the process plant.

11. The remote user interface device of claim 10, wherein each process plant search result is presented with a thumbnail image including a preview of the duplicate process plant-related data presented in the selectable link.

12. The remote user interface device of claim 10, wherein the instructions further cause the remote user interface device to:

obtain a plurality of process plant categories corresponding to the set of process plant search results;

for each of the plurality of process plant categories, obtain a subset of the process plant search results corresponding to the respective process plant category;

present, via the user interface, indications of each of the plurality of process plant categories within the process plant search results display; and for each of the plurality of process plant categories, present, via the user interface, the subset of the process plant search results with the indication of the respective process plant category.

13. The remote user interface device of claim 12, wherein to present the subset of the process plant search results with the indication of the respective process plant category, the instructions cause the remote user interface device to:

in response to receiving a selection of one of the indications of the plurality of process plant categories, present, via the user interface, the subset of the process plant search results corresponding to the selected process plant category.

14. The remote user interface device of claim 10, wherein to obtain a set of process plant search results in response to the process plant search query, the instructions cause the remote user interface device to:

obtain a ranked set of process plant search results, each process plant search result having a respective ranking; and present, via the user interface, the set of process plant search results in a ranked order according to the respective rankings.

15. The remote user interface device of claim 10, wherein the instructions further cause the remote user interface device to:

determine a size or type of the remote user interface device; and adjust the presentation of the set of process plant search results within the process plant search results display based on the size or type of the remote user interface device.

16. The remote user interface device of claim 15, wherein the instructions further cause the remote user interface device to:

in response to determining that the remote user interface device is a mobile device, present, via the user interface, a single process plant search result within the process plant search results display.

17. The remote user interface device of claim 16, further comprising a speaker, wherein the instructions further cause the remote user interface device to:

present, via the speaker, a summary of the process plant-related data associated with the single process plant search result in an audio format.

18. The remote user interface device of claim 15, wherein the instructions further cause the remote user interface device to:

in response to determining that the size of the remote user interface device is above a threshold size, present, via the user interface, the set of process plant search results within the process plant search results display.

19. The remote user interface device of claim 10, wherein to obtain a set of process plant search results in response to the process plant search query, the instructions cause the remote user interface device to:

transmit the process plant search query to the edge computing device; and receive the set of process plant search results from the edge computing device.

20. A non-transitory computer-readable medium storing instructions thereon that, when executed by one or more processors in a remote user interface device, cause the one or more processors to:

receive a process plant search query in a natural language format from a user related to one or more process plant entities within a process plant;

obtain a set of process plant search results in response to the process plant search query from a knowledge repository at an edge-computing device generated by: (i) creating a duplicate of process plant-related data included in a field-facing component of the process plant, wherein the field-facing component interacts directly with data generated within the process plant and (ii) organizing the duplicate process plant-related data that describes attributes of the process plant entities according to semantic relations between the process plant-related data and the process plant entities, wherein the remote user interface device does not have authorized access to directly communicate with the process plant and does not directly interact with the process plant-related data generated within the process plant, and wherein the duplicate process plant-related data includes run-time data; and present the set of process plant search results within a process plant search results display of the remote user interface device, wherein each process plant search result includes a selectable link to the duplicate process plant-related data, such that user interactions with the duplicate of the process plant-related data do not effect run-time operation of the process plant, thereby allowing the remote user interface device to perform a search regarding data in the process plant of the duplicate process plant-related data so that the remote user interface device does not directly interact with the process plant-related data in the field-facing component, and allowing the remote user interface device which does not have authorized access to directly communicate with the process plant to receive the duplicate process plant-related data representing activity in the process plant in a highly secure manner without impacting performance of the process plant.

21. The non-transitory computer-readable medium of claim 20, wherein each process plant search result is presented with a thumbnail image including a preview of the duplicate process plant-related data presented in the selectable link.

22. The non-transitory computer-readable medium of claim 20, wherein the instructions further cause the one or more processors to:
  obtain a plurality of process plant categories corresponding to the set of process plant search results;
  for each of the plurality of process plant categories, obtain a subset of the process plant search results corresponding to the respective process plant category;
  present, via the user interface, indications of each of the plurality of process plant categories within the process plant search results display; and
  for each of the plurality of process plant categories, present, via the user interface, the subset of the process plant search results with the indication of the respective process plant category.

23. The non-transitory computer-readable medium of claim 20, wherein the instructions further cause the one or more processors to:
  determine a size or type of the remote user interface device; and
  adjust the presentation of the set of process plant search results within the process plant search results display based on the size or type of the remote user interface device.

* * * * *

UNITED STATES PATENT AND TRADEMARK OFFICE
CERTIFICATE OF CORRECTION

PATENT NO. : 11,768,878 B2  
APPLICATION NO. : 16/577855  
DATED : September 26, 2023  
INVENTOR(S) : Mark J. Nixon et al.

Page 1 of 2

It is certified that error appears in the above-identified patent and that said Letters Patent is hereby corrected as shown below:

In the Drawings

At Fig. 5, Sheet 5 of 14, "Grude" should be -- Crude --.

At Fig. 5, Sheet 5 of 14, "FIR E" should be -- FIRE --.

At Fig. 5, Sheet 5 of 14, "DESALTE" should be -- DESALTER --.

At Fig. 5, Sheet 5 of 14, "Stutdown.pdf" should be -- Shutdown.pdf --.

At Fig. 10, Sheet 10 of 14, Tag "1004", Line 2, "barreis." should be -- barrels. --.

At Fig. 10, Sheet 10 of 14, Tag "1004", Line 2, "copacity" should be -- capacity --.

At Fig. 11, Sheet 11 of 14, "BEFOR" should be -- BEFORE --.

At Fig. 11, Sheet 11 of 14, "FIR E" should be -- FIRE --.

At Fig. 11, Sheet 11 of 14, "DESALTE" should be -- DESALTER --.

At Fig. 11, Sheet 11 of 14, "Stutdown.pdf" should be -- Shutdown.pdf --.

In the Specification

At Column 10, Line 46, "data." should be -- data). --.

At Column 12, Line 7, "DeltaV" should be -- DeltaV™ --.

Signed and Sealed this  
Third Day of February, 2026

John A. Squires  
*Director of the United States Patent and Trademark Office*

CERTIFICATE OF CORRECTION (continued)
U.S. Pat. No. 11,768,878 B2

At Column 17, Lines 29-30, "measurements." should be -- measurements, --.

At Column 21, Line 45, ""SCOPE: USER."" should be -- "SCOPE:USER." --.

In the Claims

At Column 46, Line 57, "edge" should be -- edge- --.

At Column 46, Line 60, "edge" should be -- edge- --.

At Column 48, Line 49, "edge" should be -- edge- --.

At Column 48, Line 52, "edge" should be -- edge- --.